US010645683B2

(12) United States Patent
Xia et al.

(10) Patent No.: US 10,645,683 B2
(45) Date of Patent: May 5, 2020

(54) PHYSICAL DOWNLINK CONTROL CHANNEL TRANSMISSION METHOD AND APPARATUS

(71) Applicant: Huawei Technologies Co., Ltd., Shenzhen (CN)

(72) Inventors: Jinhuan Xia, Beijing (CN); Brian Classon, Beijing (CN); Xiangdong Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 7 days.

(21) Appl. No.: 15/883,887

(22) Filed: Jan. 30, 2018

(65) Prior Publication Data
US 2018/0160410 A1 Jun. 7, 2018

Related U.S. Application Data

(63) Continuation of application No. PCT/CN2015/085792, filed on Jul. 31, 2015.

(51) Int. Cl.
H04W 72/04 (2009.01)
H04W 88/02 (2009.01)

(52) U.S. Cl.
CPC ......... *H04W 72/042* (2013.01); *H04W 72/04* (2013.01); *H04W 72/0446* (2013.01); *H04W 72/0466* (2013.01); *H04W 88/02* (2013.01)

(58) Field of Classification Search
CPC ............... H04W 72/04; H04W 72/042; H04W 72/0466; H04W 88/02; H04W 72/0446
See application file for complete search history.

(56) References Cited

U.S. PATENT DOCUMENTS

2009/0209247 A1  8/2009  Lee et al.
2013/0286980 A1  10/2013  Liao et al.
(Continued)

FOREIGN PATENT DOCUMENTS

CN     101742682 A    6/2010
CN   101801095 AA    8/2010
(Continued)

OTHER PUBLICATIONS

3rd Generation Partnership Project; Technical Specification Group Radio Access Network; Evolved Universal Terrestrial Radio Access (E-UTRA); Physical layer procedures (Release 12), Technical Specification, 3GPP TS 36.213 V12.6.0 (Jun. 2015), 241 pages.
(Continued)

*Primary Examiner* — Sam Bhattacharya
(74) *Attorney, Agent, or Firm* — Slater Matsil, LLP

(57) ABSTRACT

Embodiments of the present invention provide a physical downlink control channel transmission method and apparatus. The transmission method includes: obtaining, by UE, a parameter set for transmitting a first physical downlink control channel, where the first physical downlink control channel is used for sending same downlink control information DCI in at least R subframes; determining, by the UE according to the parameter set, N candidate locations for transmitting the first physical downlink control channel by a base station, where the candidate location includes the R subframes; monitoring, by the UE at the N candidate locations, whether the base station sends the first physical downlink control channel; and receiving, by the UE at a first candidate location, the first physical downlink control channel sent by the base station, where the N candidate locations include the first candidate location.

20 Claims, 5 Drawing Sheets

(56) References Cited

U.S. PATENT DOCUMENTS

| | | | |
|---|---|---|---|
| 2015/0131579 A1 | 5/2015 | Li et al. | |
| 2015/0181576 A1 | 6/2015 | Papasakellariou et al. | |
| 2015/0181577 A1* | 6/2015 | Moulsley | H04L 5/0053 370/329 |
| 2015/0282128 A1 | 10/2015 | Cui et al. | |
| 2015/0358124 A1* | 12/2015 | Suzuki | H04L 1/1861 370/329 |
| 2016/0242169 A1 | 8/2016 | Park et al. | |
| 2016/0278054 A1 | 9/2016 | You et al. | |
| 2016/0353420 A1 | 12/2016 | You et al. | |

FOREIGN PATENT DOCUMENTS

| | | |
|---|---|---|
| CN | 102215094 A | 10/2011 |
| CN | 103200683 A | 7/2013 |
| CN | 103795516 A | 5/2014 |
| EP | 2922225 A1 | 9/2015 |
| EP | 2950600 A1 | 12/2015 |
| JP | 2015515189 A | 5/2015 |
| KR | 20150035672 A | 4/2015 |
| WO | 2014046773 A1 | 3/2014 |
| WO | 2014048184 A1 | 4/2014 |
| WO | 2014077577 A1 | 5/2014 |
| WO | 2014109621 A1 | 7/2014 |
| WO | 2014115781 A1 | 7/2014 |
| WO | 2015093851 A1 | 6/2015 |

OTHER PUBLICATIONS

3rd Generation Partnership Project; Technical Specification Group Radio Access Network; Evolved Universal Terrestrial Radio Access (E-UTRA); Physical channels and modulation (Release 12), Technical Specification, 3GPP TS 36.211 V12.6.0 (Jun. 2015), 136 pages.

3rd Generation Partnership Project; Technical Specification Group Radio Access Network: Evolved Universal Terrestrial Radio Access (E-UTRA); Multiplexing and channel coding (Release 12), Technical Specification, 3GPP TS 36.212 V12.5.0 (Jun. 2015), 94 pages.

3rd Generation Partnership Project: Technical Specification Group Radio Access Network; Evolved Universal Terrestrial Radio Access (E-UTRA); Radio Resource Control (RRC); Protocol specification (Release 12), Technical Specification, 3GPP TS 36.331 V12.6.0 (Jun. 2015), 449 pages.

Catt, "(E)PDCCH coverage improvement for MTC UEs," 3GPP TSG RAN WG1#75, R1-135066, San Francisco, USA, Nov. 11-15, 2013, 1 page.

Sony, "(E)PDCCH candidates during MTC coverage extension repetition," 3GPP TSG RAN WG1#76, R1-140585, Prague, Czech Republic, Feb. 10-14, 2014, 4 pages.

3rd Generation Partnership Project (3GPP), "6 .2 RRC messages", 3GPP Draft; Need on 331-C41-ATTACH R2-150374, Feb. 8, 2015, 207 pages.

Alcatel-Lucent, "Discussion on use of Need code ON," 3GPP TSG-RAN WG2 Meeting #89, R2-150374, Athens, Greece, Feb. 2-6, 2015, 4 pages.

* cited by examiner

PHYSICAL DOWNLINK CONTROL CHANNEL TRANSMISSION METHOD AND APPARATUS

CROSS-REFERENCE TO RELATED APPLICATIONS

This application is a continuation of international application No. PCT/CN2015/085792, filed on Jul. 31, 2015, which is hereby incorporated by reference in its entirety.

TECHNICAL FIELD

The present invention relates to the communications field, and in particular, to a physical downlink control channel transmission method and apparatus.

BACKGROUND

In a long term evolution (LTE) system, before sending an enhanced physical downlink control channel (EPDCCH) to user equipment (UE), a base station usually needs to send one or two EPDCCH configuration sets to the UE. The EPDCCH configuration set includes configuration information such as a transmission type of the EPDCCH and a quantity of physical resource blocks (PRBs) occupied by the EPDCCH. Specifically, the configuration information in the EPDCCH configuration set may indicate multiple candidate EPDCCHs, that is, a candidate EPDCCH set. According to a definition in the 3GPP TS 36.213 protocol, in one subframe (1 ms), each UE needs to monitor multiple candidate EPDCCHs and attempt to decode each candidate EPDCCH in a candidate EPDCCH set, until the UE correctly receives, on a candidate location, an EPDCCH sent by the base station in the subframe. The EPDCCH is any candidate EPDCCH in the candidate EPDCCH set.

However, a UE with relatively poor communication performance, such as a UE located in a basement, may fail to correctly decode and receive, in one subframe, an EPDCCH sent by a base station. Consequently, the UE may be unable to perform normal interaction with the base station in a relatively long time, and communication quality between the UE and the base station is reduced.

SUMMARY

Embodiments of the present invention provide a physical downlink control channel transmission method and apparatus, so as to enhance signal strength of receiving a physical downlink control channel by UE and improve communication quality between the UE and a base station.

To achieve the foregoing objective, the following technical solutions are used in the embodiments of the present invention.

According to a first aspect, an embodiment of the present invention provides a physical downlink control channel transmission method. The method includes obtaining, by UE, a parameter set for transmitting a first physical downlink control channel, where the first physical downlink control channel is used for sending same downlink control information DCI in at least R subframes, and R is an integer greater than or equal to 1. The method also includes determining, by the UE according to the parameter set, N candidate locations for transmitting the first physical downlink control channel by a base station, where the candidate location includes the R subframes, and N is an integer greater than or equal to 1. The method also includes monitoring, by the UE at the N candidate locations, whether the base station sends the first physical downlink control channel. The method also includes receiving, by the UE at a first candidate location, the first physical downlink control channel sent by the base station, where the N candidate locations include the first candidate location.

With reference to the first aspect, in a first possible implementation of the first aspect, the parameter set includes information indicating the R subframes occupied for transmitting the first physical downlink control channel, and the following parameters in each of the R subframes: a quantity of enhanced control channel elements ECCEs constituting the first physical downlink control channel, indices of the ECCEs, a first parameter used to determine a scrambling code sequence for scrambling a block of bits transmitted on the first physical downlink control channel, a second parameter used to determine a demodulation reference signal associated with the first physical downlink control channel, an antenna port number associated with the first physical downlink control channel, and a transmission type of the first physical downlink control channel.

With reference to the first possible implementation of the first aspect, in a second possible implementation of the first aspect, the information about the R subframes is location information of the R subframes or location information of a start subframe of the R subframes.

With reference to the second possible implementation of the first aspect, in a third possible implementation of the first aspect, multiple candidate locations are set for the R subframes on a same frequency domain resource; and the obtaining, by UE, information about the R subframes occupied for sending the first physical downlink control channel includes: obtaining, by the UE, location information of the R subframes or location information of a start subframe of the R subframes at each candidate location, where a first offset exists between the $M^{th}$ candidate location and the $(M-1)^{th}$ candidate location, and M is an integer greater than 1.

With reference to the second possible implementation of the first aspect, in a fourth possible implementation of the first aspect, the obtaining, by UE, information about the R subframes occupied for sending the first physical downlink control channel includes: determining, by the UE, a format of the DCI carried on the first physical downlink control channel; and obtaining, by the UE, the location information of the R subframes or the location information of the start subframe of the R subframes according to the format of the DCI.

With reference to any one of the first to the fourth possible implementations of the first aspect, in a fifth possible implementation of the first aspect, the parameter set further includes information indicating P subframes occupied for sending the first physical downlink control channel, where a location of a start subframe of the P subframes is the same as a location of the start subframe of the R subframes, DCI sent on the first physical downlink control channel in the P subframes is the same as the DCI sent in the R subframes, P is an integer greater than or equal to 1, and P is not equal to R.

With reference to any one of the first to the fifth possible implementations of the first aspect, in a sixth possible implementation of the first aspect, the obtaining, by UE, a quantity of ECCEs constituting the first physical downlink control channel in each of the R subframes includes: obtaining, by the UE, a transmission set for transmitting the first physical downlink control channel, where the transmission set includes one or more of a quantity of PRBs occupied for transmitting the first physical downlink control channel, the format of the DCI, a type of a cyclic prefix CP, or a frame structure type, and the frame structure type includes a first frame structure type or a second frame structure type; and determining, by the UE according to the transmission set, the quantity of ECCEs constituting the first physical downlink control channel.

With reference to the sixth possible implementation of the first aspect, in a seventh possible implementation of the first aspect, the determining, by the UE according to the transmission set, the quantity of ECCEs constituting the first physical downlink control channel includes: determining, by the UE according to the transmission set, a quantity of ECCEs constituting the first physical downlink control channel in a first subframe of the R subframes, where the first subframe is any one of the R subframes; and determining, by the UE according to a first preset rule and the quantity of ECCEs constituting the first physical downlink control channel in the first subframe, a quantity of ECCEs constituting the first physical downlink control channel in each of R−1 other subframes than the first subframe of the R subframes.

With reference to any one of the first to the fifth possible implementations of the first aspect, in an eighth possible implementation of the first aspect, the obtaining, by UE, a quantity of ECCEs constituting the first physical downlink control channel in each of the R subframes includes: receiving, by the UE, a quantity that is of ECCEs constituting the first physical downlink control channel in a first subframe of the R subframes and that is sent by the base station, where the first subframe is any one of the R subframes; and determining, by the UE according to a first preset rule and the quantity of ECCEs constituting the first physical downlink control channel in the first subframe, a quantity of ECCEs constituting the first physical downlink control channel in each of R−1 other subframes than the first subframe of the R subframes.

With reference to the seventh or the eighth possible implementation of the first aspect, in a ninth possible implementation of the first aspect, if the quantity of ECCEs constituting the first physical downlink control channel in the first subframe is 16 or 24, and the R−1 other subframes include a first-type special subframe, a quantity of ECCEs constituting the first physical downlink control channel in the first-type special subframe is 12 or is less than 12; or if the first subframe is a first-type special subframe, the quantity of ECCEs constituting the first physical downlink control channel in the first subframe is 12, and the R−1 other subframes include a normal subframe, a quantity of ECCEs constituting the first physical downlink control channel in the normal subframe is 12, 24, or 16, where the first-type special subframe is a corresponding special subframe when a configuration of the special subframe in the second frame structure type is 1, 2, 6, 7, or 9.

With reference to any one of the sixth to the ninth possible implementations of the first aspect, in a tenth possible implementation of the first aspect, the obtaining, by UE, indices of the ECCEs constituting the first physical downlink control channel in each of the R subframes includes: determining, by the UE, indices of the ECCEs in the first subframe of the R subframes according to the quantity of ECCEs constituting the first physical downlink control channel in the first subframe, a quantity of candidate locations for sending the first physical downlink control channel in the first subframe, and a quantity of ECCEs included in the first subframe; and determining, by the UE, indices of the ECCEs in each of the R−1 other subframes than the first subframe of the R subframes according to a second preset rule and the indices of the ECCEs in the first subframe.

With reference to any one of the sixth to the ninth possible implementations of the first aspect, in an eleventh possible implementation of the first aspect, the obtaining, by UE, indices of the ECCEs constituting the first physical downlink control channel in each of the R subframes includes: receiving, by the UE, indices that are of the ECCEs constituting the first physical downlink control channel in the first subframe of the R subframes and that are sent by the base station; and determining, by the UE according to a second preset rule and the indices of the ECCEs constituting the first physical downlink control channel in the first subframe, indices of the ECCEs constituting the first physical downlink control channel in each of the R−1 other subframes than the first subframe of the R subframes.

With reference to any one of the first to the eleventh possible implementations of the first aspect, in a twelfth possible implementation of the first aspect, the obtaining, by UE, a first parameter used to determine a scrambling code sequence for scrambling a block of bits transmitted on the first physical downlink control channel includes: when the first physical downlink control channel is mapped to physical resource blocks PRBs included in two EPDCCH configuration sets, determining, by the UE, the first parameter according to parameters that are in the two EPDCCH configuration sets and that are respectively used to determine a scrambling code sequence.

With reference to any one of the first to the eleventh possible implementations of the first aspect, in a thirteenth possible implementation of the first aspect, the obtaining, by UE, a second parameter used to determine a demodulation reference signal associated with the first physical downlink control channel includes: when the first physical downlink control channel is mapped to physical resource blocks PRBs included in two EPDCCH configuration sets, determining, by the UE, the second parameter according to parameters that are in the two EPDCCH configuration sets and that are respectively used to determine a demodulation reference signal.

With reference to any one of the first to the thirteenth possible implementations of the first aspect, in a fourteenth possible implementation of the first aspect, the obtaining, by UE, an antenna port number associated with the first physical downlink control channel in each of the R subframes includes: if the DCI carried on the first physical downlink control channel is used to schedule a cell-specific message, and a normal cyclic prefix is configured in an LTE system, determining, by the UE, that the associated antenna port number is a number in {107, 108, 109, 110}; if the DCI carried on the first physical downlink control channel is used to schedule a cell-specific message, and an extended cyclic prefix is configured in an LTE system, determining, by the UE, that the associated antenna port number is a number in {107, 108}; if the DCI carried on the first physical downlink control channel is used to schedule a UE-specific message, and a normal cyclic prefix is configured in an LTE system, when the R subframes include a normal subframe and a first-type special subframe, determining, by the UE, that the associated antenna port number is a number in {107, 109}; if the DCI carried on the first physical downlink control channel is used to schedule a UE-specific message, and a normal cyclic prefix is configured in an LTE system, when the R subframes do not include a first-type special subframe, determining, by the UE, that the associated antenna port number is a number in {107, 108, 109, 110}; or if the DCI carried on the first physical downlink control channel is used to schedule a UE-specific message, and an extended cyclic prefix is configured in an LTE system, determining, by the UE, that the associated antenna port number is a number in {107, 109}.

With reference to the fourteenth possible implementation of the first aspect, in a fifteenth possible implementation of the first aspect, if the DCI carried on the first physical downlink control channel is used to schedule the UE-specific message, and the R subframes include the normal subframe and the first-type special subframe, when the normal cyclic prefix is configured in the LTE system, the UE determines the associated antenna port number in {107, 109} according to a lowest ECCE index used in the first physical downlink control channel, the quantity of ECCEs constituting the first physical downlink control channel, and a quantity of ECCEs carried in a PRB pair in the first-type special subframe; or if the DCI carried on the first physical downlink control channel is used to schedule the UE-specific message, and the R subframes do not include the first-type special subframe, when the normal cyclic prefix is configured in the LTE system, the UE determines the associated antenna port number in {107, 108, 109, 110} according to a lowest ECCE index used in the first physical downlink control channel, the quantity of ECCEs occupied by the first physical downlink control channel, and a quantity of ECCEs carried in a PRB pair in the normal subframe.

With reference to any one of the first to the fifteenth possible implementations of the first aspect, in a sixteenth possible implementation of the first aspect, the obtaining, by UE, a parameter set for transmitting a first physical downlink control channel includes: receiving, by the UE, configuration information sent by the base station, where the configuration information includes the information indicating the R subframes occupied for sending the first physical downlink control channel; or the configuration information includes the information indicating the R subframes occupied for sending the first physical downlink control channel, and at least one of the following parameters in at least one of the R subframes: a quantity of ECCEs constituting the first physical downlink control channel, indices of the ECCEs, a first parameter used to determine a scrambling code sequence for scrambling a block of bits transmitted on the first physical downlink control channel, a second parameter used to determine a demodulation reference signal associated with the first physical downlink control channel, an associated antenna port number, or a transmission type of the first physical downlink control channel.

With reference to any one of the first to the sixteenth possible implementations of the first aspect, in a seventeenth possible implementation of the first aspect, the format of the DCI includes a first DCI format and a second DCI format, DCI in the first DCI format includes scheduling information used for scheduling a physical downlink shared channel PDSCH, and DCI in the second DCI format includes a part or all of information about a random access response RAR; and after the receiving, by the UE at a first candidate location, the first physical downlink control channel sent by the base station, the method further includes: determining, by the UE, the format of the DCI according to information about a first bit in the DCI carried on the first physical downlink control channel; or determining, by the UE, the format of the DCI according to a scrambling code for scrambling CRC, where the CRC is CRC attached to the DCI carried on the first physical downlink control channel; or determining, by the UE, the format of the DCI according to at least one of the quantity R of subframes occupied for sending the first physical downlink control channel, a quantity of ECCEs constituting the first physical downlink control channel, or indices of the ECCEs constituting the first physical downlink control channel.

According to a second aspect, an embodiment of the present invention provides a physical downlink control channel transmission method. The method includes obtaining, by a base station, a parameter set for transmitting a first physical downlink control channel, where the first physical downlink control channel is used for sending same downlink control information DCI in at least R subframes, and R is an integer greater than or equal to 1. The method also includes determining, by the base station according to the parameter set, N candidate locations for sending the first physical downlink control channel to UE, where the candidate location includes the R subframes, and N is an integer greater than or equal to 1. The method also includes determining, by the base station, a first candidate location in the N candidate locations as a location for sending the first physical downlink control channel to the UE, and sending the first physical downlink control channel to the UE at the first candidate location.

With reference to the second aspect, in a first possible implementation of the second aspect, the parameter set includes information indicating the R subframes occupied for transmitting the first physical downlink control channel, and the following parameters in each of the R subframes: a quantity of enhanced control channel elements ECCEs constituting the first physical downlink control channel, indices of the ECCEs, a first parameter used to determine a scrambling code sequence for scrambling a block of bits transmitted on the first physical downlink control channel, a second parameter used to determine a demodulation reference signal associated with the first physical downlink control channel, an antenna port number associated with the first physical downlink control channel, and a transmission type of the first physical downlink control channel.

With reference to the second aspect or the first possible implementation of the second aspect, in a second possible implementation of the second aspect, after the obtaining, by a base station, a parameter set for transmitting a first physical downlink control channel, the method further includes: sending, by the base station, configuration information to the UE, where the configuration information includes the information indicating the R subframes occupied for sending the first physical downlink control channel; or the configuration information includes the information indicating the R subframes occupied for sending the first physical downlink control channel, and at least one of the following parameters in at least one of the R subframes: a quantity of ECCEs constituting the first physical downlink control channel, indices of the ECCEs, a first parameter used to determine a scrambling code sequence for scrambling a block of bits transmitted on the first physical downlink control channel, a second parameter used to determine a demodulation reference signal associated with the first physical downlink control channel, an antenna port number associated with the first physical downlink control channel, or a transmission type of the first physical downlink control channel.

According to a third aspect, an embodiment of the present invention provides a physical downlink control channel transmission apparatus. The apparatus includes a first obtaining unit, configured to obtain a parameter set for transmitting a first physical downlink control channel, where the first physical downlink control channel is used for sending same downlink control information DCI in at least R subframes, and R is an integer greater than or equal to 1.

The apparatus also includes a first determining unit, configured to determine, according to the parameter set, N candidate locations for transmitting the first physical downlink control channel by a base station, where the candidate location includes the R subframes, and N is an integer greater than or equal to 1. The apparatus also includes a monitoring unit, configured to monitor, at the N candidate locations, whether the base station sends the first physical downlink control channel. The apparatus also includes a receiving unit, configured to receive, at a first candidate location, the first physical downlink control channel sent by the base station, where the N candidate locations include the first candidate location, where the parameter set includes information indicating the R subframes occupied for transmitting the first physical downlink control channel, and the following parameters in each of the R subframes: a quantity of enhanced control channel elements ECCEs constituting the first physical downlink control channel, indices of the ECCEs, a first parameter used to determine a scrambling code sequence for scrambling a block of bits transmitted on the first physical downlink control channel, a second parameter used to determine a demodulation reference signal associated with the first physical downlink control channel, an antenna port number associated with the first physical downlink control channel, and a transmission type of the first physical downlink control channel.

With reference to the third aspect, in a first possible implementation of the third aspect, the first obtaining unit is specifically configured to obtain location information of the R subframes or location information of a start subframe of the R subframes at each candidate location, where multiple candidate locations are set for the R subframes on a same frequency domain resource, a first offset exists between the $M^{th}$ candidate location and the $(M-1)^{th}$ candidate location, and M is an integer greater than 1.

With reference to the third aspect, in a second possible implementation of the third aspect, the first determining unit is further configured to determine a format of the DCI carried on the first physical downlink control channel; and the first obtaining unit is specifically configured to obtain location information of the R subframes or location information of a start subframe of the R subframes according to the format of the DCI.

With reference to any one of the third aspect, or the first and the second possible implementations of the third aspect, in a third possible implementation of the third aspect, the first obtaining unit is specifically configured to obtain a transmission set for transmitting the first physical downlink control channel, where the transmission set includes one or more of a quantity of PRBs occupied for transmitting the first physical downlink control channel, the format of the DCI, a type of a cyclic prefix CP, or a frame structure type, and the frame structure type includes a first frame structure type or a second frame structure type; and the first determining unit is further configured to determine, according to the transmission set, the quantity of ECCEs constituting the first physical downlink control channel.

With reference to the third possible implementation of the third aspect, in a fourth possible implementation of the third aspect, the first determining unit is specifically configured to: determine, according to the transmission set, a quantity of ECCEs constituting the first physical downlink control channel in a first subframe of the R subframes, where the first subframe is any one of the R subframes; and determine, according to a first preset rule and the quantity of ECCEs constituting the first physical downlink control channel in the first subframe, a quantity of ECCEs constituting the first physical downlink control channel in each of R−1 other subframes than the first subframe of the R subframes.

With reference to any one of the third aspect, or the first to fourth possible implementations of the third aspect, in a fifth possible implementation of the third aspect, the first determining unit is further configured to: determine indices of the ECCEs in the first subframe of the R subframes according to the quantity of ECCEs constituting the first physical downlink control channel in the first subframe, a quantity of candidate locations for sending the first physical downlink control channel in the first subframe, and a quantity of ECCEs included in the first subframe; and determine indices of the ECCEs in each of the R−1 other subframes than the first subframe of the R subframes according to a second preset rule and the indices of the ECCEs in the first subframe.

With reference to any one of the third aspect, or the first to the fifth possible implementations of the third aspect, in a sixth possible implementation of the third aspect, the first determining unit is further configured to: when the first physical downlink control channel is mapped to physical resource blocks PRBs included in two EPDCCH configuration sets, determine the first parameter according to parameters that are in the two EPDCCH configuration sets and that are respectively used to determine a scrambling code sequence.

With reference to any one of the third aspect, or the first to the fifth possible implementations of the third aspect, in a seventh possible implementation of the third aspect, the first determining unit is further configured to: when the first physical downlink control channel is mapped to physical resource blocks (PRBs) included in two EPDCCH configuration sets, determine the second parameter according to parameters that are in the two EPDCCH configuration sets and that are respectively used to determine a demodulation reference signal.

With reference to any one of the third aspect, or the first to the seventh possible implementations of the third aspect, in an eighth possible implementation of the third aspect, the first determining unit is further configured to: if the DCI carried on the first physical downlink control channel is used to schedule a cell-specific message, and a normal cyclic prefix is configured in an LTE system, determine that the associated antenna port number is a number in {107, 108, 109, 110}; if the DCI carried on the first physical downlink control channel is used to schedule a cell-specific message, and an extended cyclic prefix is configured in an LTE system, determine that the associated antenna port number is a number in {107,108}; if the DCI carried on the first physical downlink control channel is used to schedule a UE-specific message, and a normal cyclic prefix is configured in an LTE system, when the R subframes include a normal subframe and a first-type special subframe, determine that the associated antenna port number is a number in {107, 109}; if the DCI carried on the first physical downlink control channel is used to schedule a UE-specific message, and a normal cyclic prefix is configured in an LTE system, when the R subframes do not include a first-type special subframe, determine that the associated antenna port number is a number in {107, 108, 109, 110}; or if the DCI carried on the first physical downlink control channel is used to schedule a UE-specific message, and an extended cyclic prefix is configured in an LTE system, determine that the associated antenna port number is a number in {107, 109}.

With reference to any one of the third aspect, or the first to the eighth possible implementations of the third aspect, in a ninth possible implementation of the third aspect, the receiving unit is further configured to receive configuration information sent by the base station, where the configuration information includes the information indicating the R subframes occupied for sending the first physical downlink control channel; or the configuration information includes the information indicating the R subframes occupied for sending the first physical downlink control channel, and at least one of the following parameters in at least one of the R subframes: a quantity of ECCEs constituting the first physical downlink control channel, indices of the ECCEs, a first parameter used to determine a scrambling code sequence for scrambling a block of bits transmitted on the first physical downlink control channel, a second parameter used to determine a demodulation reference signal associated with the first physical downlink control channel, an associated antenna port number, or a transmission type of the first physical downlink control channel.

With reference to any one of the third aspect, or the first to the ninth possible implementations of the third aspect, in a tenth possible implementation of the third aspect, the first determining unit is further configured to: determine the format of the DCI according to information about a first bit in the DCI carried on the first physical downlink control channel; or determine the format of the DCI according to a scrambling code for scrambling CRC, where the CRC is CRC attached to the DCI carried on the first physical downlink control channel; or determine the format of the DCI according to at least one of the quantity R of subframes occupied for sending the first physical downlink control channel, a quantity of ECCEs constituting the first physical downlink control channel, or indices of the ECCEs constituting the first physical downlink control channel, where the format of the DCI includes a first DCI format and a second DCI format, DCI in the first DCI format includes scheduling information used for scheduling a physical downlink shared channel PDSCH, and DCI in the second DCI format includes a part or all of information about a random access response RAR.

According to a fourth aspect, an embodiment of the present invention provides a physical downlink control channel transmission apparatus. The apparatus includes a second obtaining unit, configured to obtain a parameter set for transmitting a first physical downlink control channel, where the first physical downlink control channel is used for sending same downlink control information DCI in at least R subframes, and R is an integer greater than or equal to 1. The apparatus also includes second determining unit, configured to: determine, according to the parameter set, N candidate locations for sending the first physical downlink control channel to UE, where the candidate location includes the R subframes, and N is an integer greater than or equal to 1; and determine a first candidate location in the N candidate locations as a location for sending the first physical downlink control channel to the UE. The apparatus also includes a sending unit, configured to send the first physical downlink control channel to the UE at the first candidate location, where the parameter set includes information indicating the R subframes occupied for transmitting the first physical downlink control channel, and the following parameters in each of the R subframes: a quantity of enhanced control channel elements ECCEs constituting the first physical downlink control channel, indices of the ECCEs, a first parameter used to determine a scrambling code sequence for scrambling a block of bits transmitted on the first physical downlink control channel, a second parameter used to determine a demodulation reference signal associated with the first physical downlink control channel, an antenna port number associated with the first physical downlink control channel, and a transmission type of the first physical downlink control channel.

With reference to the fourth aspect, in a first possible implementation of the fourth aspect, the sending unit is further configured to send configuration information to the UE, where the configuration information includes the information indicating the R subframes occupied for sending the first physical downlink control channel; or the configuration information includes the information indicating the R subframes occupied for sending the first physical downlink control channel, and at least one of the following parameters in at least one of the R subframes: a quantity of ECCEs constituting the first physical downlink control channel, indices of the ECCEs, a first parameter used to determine a scrambling code sequence for scrambling a block of bits transmitted on the first physical downlink control channel, a second parameter used to determine a demodulation reference signal associated with the first physical downlink control channel, an antenna port number associated with the first physical downlink control channel, or a transmission type of the first physical downlink control channel.

According to a fifth aspect, an embodiment of the present invention provides a physical downlink control channel transmission apparatus. The apparatus includes a first processor and a first transceiver that is connected to the first processor. The first processor is configured to: obtain a parameter set for transmitting a first physical downlink control channel, where the first physical downlink control channel is used for sending same downlink control information DCI in at least R subframes, and R is an integer greater than or equal to 1. The first processor is further configured to determine, according to the parameter set, N candidate locations for transmitting the first physical downlink control channel by a base station, where the candidate location includes the R subframes, and N is an integer greater than or equal to 1. The first processor is further configured to monitor, at the N candidate locations using the first transceiver, whether the base station sends the first physical downlink control channel. The first transceiver is further configured to receive, at a first candidate location, the first physical downlink control channel sent by the base station, where the N candidate locations include the first candidate location, where the parameter set includes information indicating the R subframes occupied for transmitting the first physical downlink control channel, and the following parameters in each of the R subframes: a quantity of enhanced control channel elements ECCEs constituting the first physical downlink control channel, indices of the ECCEs, a first parameter used to determine a scrambling code sequence for scrambling a block of bits transmitted on the first physical downlink control channel, a second parameter used to determine a demodulation reference signal associated with the first physical downlink control channel, an antenna port number associated with the first physical downlink control channel, and a transmission type of the first physical downlink control channel.

With reference to the fifth aspect, in a first possible implementation of the fifth aspect, the information about the R subframes that is obtained by the first processor may be specifically location information of the R subframes or location information of a start subframe of the R subframes.

With reference to the first possible implementation of the fifth aspect, in a second possible implementation of the fifth aspect, multiple candidate locations are set for the R subframes on a same frequency domain resource; and in this case, that the first processor obtains information about the R subframes occupied for sending the first physical downlink control channel may specifically include the following step: the first processor may obtain, from the base station by using the first transceiver, location information of the R subframes or location information of a start subframe of the R subframes at each candidate location, where a first offset exists between the $M^{th}$ candidate location and the $(M-1)^{th}$ candidate location, and M is an integer greater than 1.

With reference to the first possible implementation of the fifth aspect, in a third possible implementation of the fifth aspect, that the first processor obtains information about the R subframes occupied for sending the first physical downlink control channel may specifically include the following steps: the first processor determines a format of the DCI carried on the first physical downlink control channel, and the first processor obtains the location information of the R subframes or the location information of the start subframe of the R subframes according to the format of the DCI.

With reference to any one of the first to the third possible implementations of the fifth aspect, in a fourth possible implementation of the fifth aspect, the parameter set obtained by the first processor may further include information indicating P subframes occupied for sending the first physical downlink control channel, where a location of a start subframe of the P subframes is the same as a location of the start subframe of the R subframes, DCI sent on the first physical downlink control channel in the P subframes is the same as the DCI sent in the R subframes, P is an integer greater than or equal to 1, and P is not equal to R.

With reference to any one of the first to the fourth possible implementations of the fifth aspect, in a fifth possible implementation of the fifth aspect, that the first processor obtains a quantity of ECCEs constituting the first physical downlink control channel in each of the R subframes may specifically include the following steps: the first processor obtains a transmission set for transmitting the first physical downlink control channel, where the transmission set includes one or more of a quantity of PRBs occupied for transmitting the first physical downlink control channel, the format of the DCI, a type of a cyclic prefix CP, or a frame structure type, and the frame structure type includes a first frame structure type or a second frame structure type; and the first processor determines, according to the transmission set, the quantity of ECCEs constituting the first physical downlink control channel.

With reference to the fifth possible implementation of the fifth aspect, in a sixth possible implementation of the fifth aspect, that the first processor determines, according to the transmission set, the quantity of ECCEs constituting the first physical downlink control channel may specifically include the following steps: the first processor determines, according to the transmission set, a quantity of ECCEs constituting the first physical downlink control channel in a first subframe of the R subframes, where the first subframe is any one of the R subframes; and the first processor determines, according to a first preset rule and the quantity of ECCEs constituting the first physical downlink control channel in the first subframe, a quantity of ECCEs constituting the first physical downlink control channel in each of R−1 other subframes than the first subframe of the R subframes.

With reference to the fifth possible implementation of the fifth aspect, in a seventh possible implementation of the fifth aspect, the first processor may further receive, by using the first transceiver, a quantity that is of ECCEs constituting the first physical downlink control channel in a first subframe of the R subframes and that is sent by the base station, where the first subframe is any one of the R subframes; and the first processor determines, according to a first preset rule and the quantity of ECCEs constituting the first physical downlink control channel in the first subframe, a quantity of ECCEs constituting the first physical downlink control channel in each of R−1 other subframes than the first subframe of the R subframes.

With reference to any one of the first to the seventh possible implementations of the fifth aspect, in an eighth possible implementation of the fifth aspect, that the first processor obtains indices of the ECCEs constituting the first physical downlink control channel in each of the R subframes may specifically include the following steps: the first processor determines indices of the ECCEs in the first subframe of the R subframes according to the quantity of ECCEs constituting the first physical downlink control channel in the first subframe, a quantity of candidate locations for sending the first physical downlink control channel in the first subframe, and a quantity of ECCEs included in the first subframe; and the first processor determines indices of the ECCEs in each of the R−1 other subframes than the first subframe of the R subframes according to a second preset rule and the indices of the ECCEs in the first subframe.

With reference to any one of the first to the seventh possible implementations of the fifth aspect, in a ninth possible implementation of the fifth aspect, the first processor may further receive, by using the first transceiver, indices that are of the ECCEs constituting the first physical downlink control channel in the first subframe of the R subframes and that are sent by the base station; and the first processor determines, according to a second preset rule and the indices of the ECCEs constituting the first physical downlink control channel in the first subframe, indices of the ECCEs constituting the first physical downlink control channel in each of the R−1 other subframes than the first subframe of the R subframes.

With reference to any one of the first to the ninth possible implementations of the fifth aspect, in a tenth possible implementation of the fifth aspect, when the first processor obtains the first parameter used to determine the scrambling code sequence for scrambling the block of bits transmitted on the first physical downlink control channel, the following step may be specifically included: when the first physical downlink control channel is mapped to physical resource blocks PRBs included in two EPDCCH configuration sets, the first processor determines the first parameter according to parameters that are in the two EPDCCH configuration sets and that are respectively used to determine a scrambling code sequence.

With reference to any one of the first to the ninth possible implementations of the fifth aspect, in an eleventh possible implementation of the fifth aspect, when the first processor obtains the second parameter used to determine the demodulation reference signal associated with the first physical downlink control channel, the following step may be specifically included: when the first physical downlink control channel is mapped to physical resource blocks PRBs included in two EPDCCH configuration sets, the first processor determines the second parameter according to parameters that are in the two EPDCCH configuration sets and that are respectively used to determine a demodulation reference signal.

With reference to any one of the first to the eleventh possible implementations of the fifth aspect, in a twelfth possible implementation of the fifth aspect, when the first processor obtains the antenna port number associated with the first physical downlink control channel in each of the R subframes, the following step may be specifically included: if the DCI carried on the first physical downlink control channel is used to schedule a cell-specific message, and a normal cyclic prefix is configured in an LTE system, the first processor determines that the associated antenna port number is a number in {107, 108, 109, 110}; if the DCI carried on the first physical downlink control channel is used to schedule a cell-specific message, and an extended cyclic prefix is configured in an LTE system, the first processor determines that the associated antenna port number is a number in {107, 108}; if the DCI carried on the first physical downlink control channel is used to schedule a UE-specific message, and a normal cyclic prefix is configured in an LTE system, when the R subframes include a normal subframe and a first-type special subframe, the first processor determines that the associated antenna port number is a number in {107, 109}; if the DCI carried on the first physical downlink control channel is used to schedule a UE-specific message, and a normal cyclic prefix is configured in an LTE system, when the R subframes do not include a first-type special subframe, the first processor determines that the associated antenna port number is a number in {107, 108, 109, 110}; or if the DCI carried on the first physical downlink control channel is used to schedule a UE-specific message, and an extended cyclic prefix is configured in an LTE system, the first processor determines that the associated antenna port number is a number in {107,109}.

With reference to any one of the first to the twelfth possible implementations of the fifth aspect, in a thirteenth possible implementation of the fifth aspect, when obtaining the parameter set for transmitting the first physical downlink control channel, the first processor may receive, by using the first transceiver, configuration information sent by the base station, where the configuration information includes the information indicating the R subframes occupied for sending the first physical downlink control channel; or the configuration information includes the information indicating the R subframes occupied for sending the first physical downlink control channel, and at least one of the following parameters in at least one of the R subframes: a quantity of ECCEs constituting the first physical downlink control channel, indices of the ECCEs, a first parameter used to determine a scrambling code sequence for scrambling a block of bits transmitted on the first physical downlink control channel, a second parameter used to determine a demodulation reference signal associated with the first physical downlink control channel, an associated antenna port number, or a transmission type of the first physical downlink control channel.

With reference to any one of the first to the thirteenth possible implementations of the fifth aspect, in a fourteenth possible implementation of the fifth aspect, the format of the DCI includes a first DCI format and a second DCI format, DCI in the first DCI format includes scheduling information used for scheduling a physical downlink shared channel PDSCH, and DCI in the second DCI format includes a part or all of information about a random access response RAR; and after the first transceiver receives, at the first candidate location, the first physical downlink control channel sent by the base station, the following step may be further included: the first processor determines the format of the DCI according to information about a first bit in the DCI carried on the first physical downlink control channel; or the first processor determines the format of the DCI according to a scrambling code for scrambling CRC, where the CRC is CRC attached to the DCI carried on the first physical downlink control channel; or the first processor determines the format of the DCI according to at least one of the quantity R of subframes occupied for sending the first physical downlink control channel, a quantity of ECCEs constituting the first physical downlink control channel, or indices of the ECCEs constituting the first physical downlink control channel.

According to a sixth aspect, an embodiment of the present invention provides a physical downlink control channel transmission apparatus. The apparatus includes a second processor and a second transceiver that is connected to the second processor. The second processor is configured to obtain a parameter set for transmitting a first physical downlink control channel, where the first physical downlink control channel is used for sending same downlink control information DCI in at least R subframes, and R is an integer greater than or equal to 1. The second processor is further configured to determine, according to the parameter set, N candidate locations for sending the first physical downlink control channel to UE, where the candidate location includes the R subframes, and N is an integer greater than or equal to 1. The second processor is further configured to determine a first candidate location in the N candidate locations as a location for sending the first physical downlink control channel to the UE. The second transceiver is configured to send the first physical downlink control channel to the UE at the first candidate location, where the parameter set includes information indicating the R subframes occupied for transmitting the first physical downlink control channel, and the following parameters in each of the R subframes: a quantity of enhanced control channel elements ECCEs constituting the first physical downlink control channel, indices of the ECCEs, a first parameter used to determine a scrambling code sequence for scrambling a block of bits transmitted on the first physical downlink control channel, a second parameter used to determine a demodulation reference signal associated with the first physical downlink control channel, an antenna port number associated with the first physical downlink control channel, and a transmission type of the first physical downlink control channel.

According to the downlink control channel transmission method and apparatus provided in the embodiments of the present invention, a UE obtains a parameter set for transmitting a first physical downlink control channel, and determines, according to the parameter set, N candidate locations for transmitting the first physical downlink control channel by a base station. Each candidate location includes R subframes, and same DCI is included in the R subframes. That is, according to the physical downlink control channel transmission method provided in this embodiment of the present invention, the first physical downlink control channel may be transmitted in the R subframes. Therefore, compared with a current system in which, in one subframe (1 ms), a UE needs to monitor multiple candidate EPDCCHs and attempt to decode each candidate EPDCCH in a candidate EPDCCH set according to configuration information, the UE may receive the first physical downlink control channel in each of the R subframes, so that signal strength of receiving the first physical downlink control channel by the UE is enhanced.

BRIEF DESCRIPTION OF THE DRAWINGS

To describe the technical solutions in the embodiments of the present invention or in the prior art more clearly, the following briefly describes the accompanying drawings required for describing the embodiments or the prior art.

DETAILED DESCRIPTION OF ILLUSTRATIVE EMBODIMENTS

The following describes the technical solutions in the embodiments of the present invention with reference to accompanying drawings in the embodiments of the present invention. Apparently, the described embodiments are merely some but not all of the embodiments of the present invention.

In addition, the terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In description of the present invention, "multiple" indicates at least two unless otherwise noted.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In addition, a UE-specific message in the embodiments of the present invention is data carried on a physical downlink shared channel (PDSCH) or a physical uplink shared channel (PUSCH). The data carries a cyclic redundancy check (CRC) bit scrambled by using a UE-specific radio network temporary identifier (RNTI), and a transport block (TB) of UE.

A cell-specific message in the embodiments of the present invention is data carried on a PDSCH. The data specifically includes a system information block (SIB), an random access response (RAR), a paging message, or the like.

Embodiment 1

Figure 1:
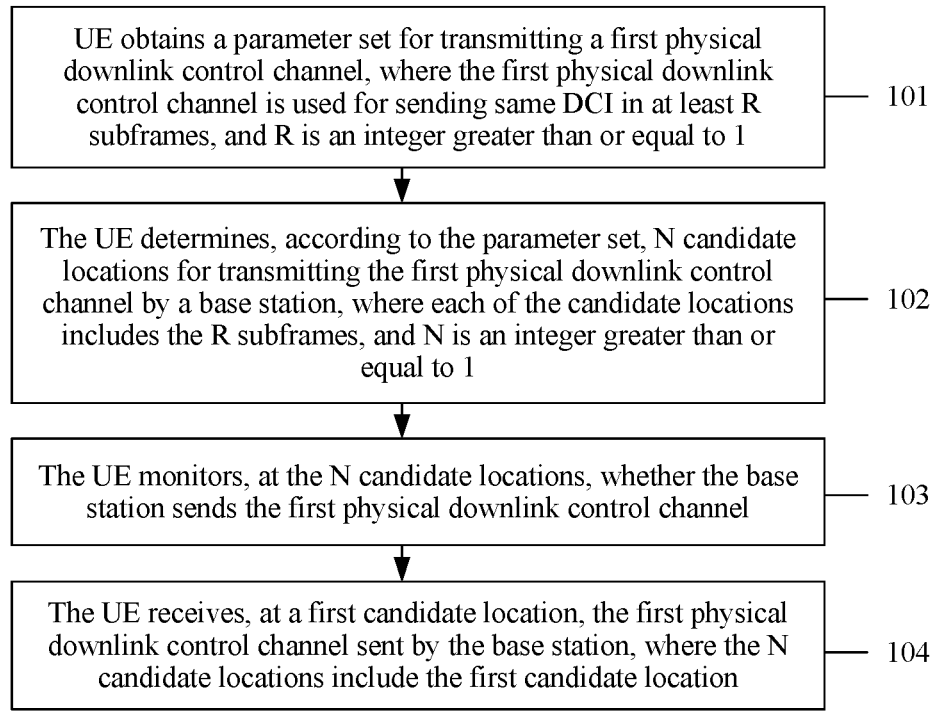
FIG. 1 is a schematic flowchart 1 of a physical downlink control channel transmission method according to an embodiment of the present invention.

An embodiment of the present invention provides a physical downlink control channel transmission method. As shown in FIG. 1, the method includes the following steps.

101. UE obtains a parameter set for transmitting a first physical downlink control channel, where the first physical downlink control channel is used for sending same downlink control information (DCI) in at least R subframes, and R is an integer greater than or equal to 1.

102. The UE determines, according to the parameter set, N candidate locations for transmitting the first physical downlink control channel by a base station, where the candidate location includes the R subframes, and N is an integer greater than or equal to 1.

103. The UE monitors, at the N candidate locations, whether the base station sends the first physical downlink control channel.

104. The UE receives, at a first candidate location, the first physical downlink control channel sent by the base station, where the N candidate locations include the first candidate location.

In this embodiment of the present invention, to improve performance of receiving, by UE, a first physical downlink control channel transmitted by a base station, a channel (that is, the first physical downlink control channel) that carries same DCI may be sent by using R subframes, and then the UE may receive, in each of the R subframes, the first physical downlink control channel sent by the base station. In this way, UE with relatively poor communication performance may correctly receive the first physical downlink control channel in the R subframes, so that signal strength of receiving the first physical downlink control channel by the UE is enhanced. That is, performance of performing channel estimation on the first physical downlink control channel by the UE is improved by using a short-term correlation of a communication environment in the R subframes, and a time-domain diversity gain is obtained by using a long-term time-varying characteristic of the communication environment, to improve performance of monitoring the first physical downlink control channel by the UE.

Specifically, in step 101, before the first physical downlink control channel is transmitted between the UE and the base station, the UE first obtains the parameter set for transmitting the first physical downlink control channel. The first physical downlink control channel is used for sending the same DCI in the at least R subframes.

Same DCI is sent in R subframes, that is, according to the physical downlink control channel transmission method provided in this embodiment of the present invention, a first physical downlink control channel may be transmitted in the R subframes. Therefore, compared with the prior art in which in one subframe (1 ms), UE needs to monitor multiple candidate EPDCCHs and attempt to decode each candidate EPDCCH in a candidate EPDCCH set according to configuration information, UE may receive the first physical downlink control channel in each of the R subframes, so that signal strength of receiving the first physical downlink control channel by the UE is enhanced.

Specifically, the parameter set in step 101 may specifically include information indicating the R subframes occupied for transmitting the first physical downlink control channel, and the following parameters in each of the R subframes: a quantity of enhanced control channel elements (ECCEs) constituting the first physical downlink control channel, indices of the ECCEs, a first parameter used to determine a scrambling code sequence for scrambling a block of bits transmitted on the first physical downlink control channel, a second parameter used to determine a demodulation reference signal associated with the first physical downlink control channel, an antenna port number associated with the first physical downlink control channel, and a transmission type of the first physical downlink control channel.

The UE may obtain each parameter in the parameter set by using configuration information sent by the base station, or may pre-store the parameter set according to a related communication protocol. Specifically, a method for obtaining each parameter in the parameter set by the UE is described in detail in the subsequent embodiment. Details are not described herein.

In this way, in step 102, the UE may determine, according to the parameter set, the N candidate locations for transmitting the first physical downlink control channel by the base station. Each of the N candidate locations includes the R subframes.

Further, in step 103, the UE monitors, at each of the N candidate locations determined in step 102, whether the base station sends the first physical downlink control channel. The monitoring means that the UE attempts to decode, at each of the N candidate locations according to a format of the received DCI, the first physical downlink control channel that may be sent by the base station.

Specifically, the parameter set for transmitting the first physical downlink control channel includes multiple parameters, and different values may be set for each parameter. Therefore, the parameter set of each group of parameters with different values may indicate one candidate location for sending the first physical downlink control channel, that is, the parameter set may indicate the N candidate locations for sending the first physical downlink control channel (N≥1). However, the UE does not know a specific candidate location at which the base station actually sends the first physical downlink control channel. Therefore, the UE needs to perform blind detection according to one or more formats of the DCI (because the UE does not know a specific format of the DCI carried on the first physical downlink control channel, the one or more formats of the DCI described herein may be indicated by the base station to the UE, or may be pre-stored in the UE) to monitor, at each candidate location, the first physical downlink control channel sent by the base station, that is, to attempt to decode the first physical downlink control channel at each candidate location according to the one or more formats of the DCI, so as to determine whether the base station sends the first physical downlink control channel at the candidate location, until the UE correctly receives, in step 104 at the first candidate location used by the base station, the first physical downlink control channel sent by the base station in the R subframes.

Figure 2:
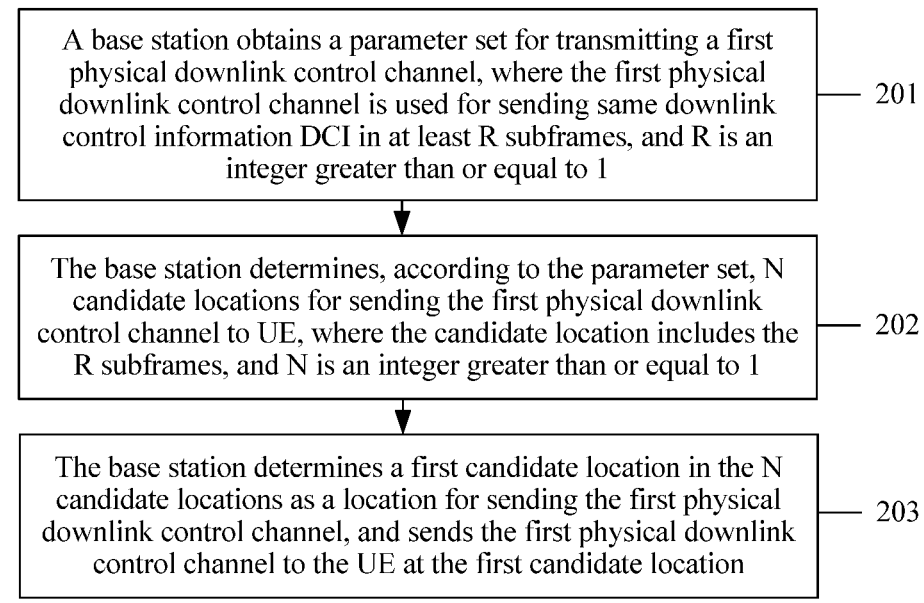
FIG. 2 is a schematic flowchart 2 of a physical downlink control channel transmission method according to an embodiment of the present invention.

An embodiment of the present invention provides a physical downlink control channel transmission method. As shown in FIG. 2, the method includes the following steps.

201. A base station obtains a parameter set for transmitting a first physical downlink control channel, where the first physical downlink control channel is used for sending same DCI in at least R subframes, and R is an integer greater than or equal to 1.

202. The base station determines, according to the parameter set, N candidate locations for sending the first physical downlink control channel to UE, where the candidate location includes the R subframes, and N is an integer greater than or equal to 1.

203. The base station determines a first candidate location in the N candidate locations as a location for sending the first physical downlink control channel, and sends the first physical downlink control channel to the UE at the first candidate location.

Specifically, in step 201, corresponding to steps 101 and 102, the base station also obtains the parameter set for transmitting the first physical downlink control channel, to send the first physical downlink control channel that carries the same downlink control information DCI in the R subframes, so as to improve a probability of correctly receiving the first physical downlink control channel by the UE. The first physical downlink control channel is used for sending the same downlink control information DCI in the at least R subframes.

Similarly, the parameter set in step 201 may specifically include information indicating the R subframes occupied for transmitting the first physical downlink control channel, and the following parameters in each of the R subframes: a quantity of ECCEs constituting the first physical downlink control channel, indices of the ECCEs, a first parameter used to determine a scrambling code sequence for scrambling a block of bits transmitted on the first physical downlink control channel, a second parameter used to determine a demodulation reference signal associated with the first physical downlink control channel, an antenna port number associated with the first physical downlink control channel, and a transmission type of the first physical downlink control channel.

In step 202, because the parameter set for transmitting the first physical downlink control channel may indicate multiple candidate locations for sending the first physical downlink control channel, the base station may determine, according to the parameter set in step 201, the N candidate locations for sending the first physical downlink control channel to the UE.

Further, in step 203, the base station may determine, according to a scheduling requirement, a pre-stored sending rule, or a related protocol stipulation, a first candidate location in the N candidate locations determined in step 202. The first candidate location is a location for sending the first physical downlink control channel. Then, the base station sends the first physical downlink control channel to the UE at the first candidate location.

Correspondingly, after the UE determines the parameter set for transmitting the first physical downlink control channel, because the UE does not know a specific candidate location at which the base station finally sends the first physical downlink control channel, the UE performs blind detection according to the parameter set to attempt to decode the first physical downlink control channel at each candidate location, so as to determine whether the base station sends the first physical downlink control channel, until the UE correctly receives, at the first candidate location, the first physical downlink control channel sent by the base station in the R subframes.

According to the physical downlink control channel transmission method provided in this embodiment of the present invention, UE obtains a parameter set for transmitting a first physical downlink control channel, and determines, according to the parameter set, N candidate locations for transmitting the first physical downlink control channel by a base station. Each candidate location includes the R subframes, and same DCI is included in the R subframes. That is, according to the physical downlink control channel transmission method provided in this embodiment of the present invention, the first physical downlink control channel may be transmitted in the R subframes. Therefore, compared with the prior art in which in one subframe (i ms), UE needs to monitor multiple candidate EPDCCHs and attempt to decode each candidate EPDCCH in a candidate EPDCCH set according to configuration information, the UE may receive the first physical downlink control channel in each of the R subframes, so that signal strength of receiving the first physical downlink control channel by the UE is enhanced.

Embodiment 2

Figure 3:
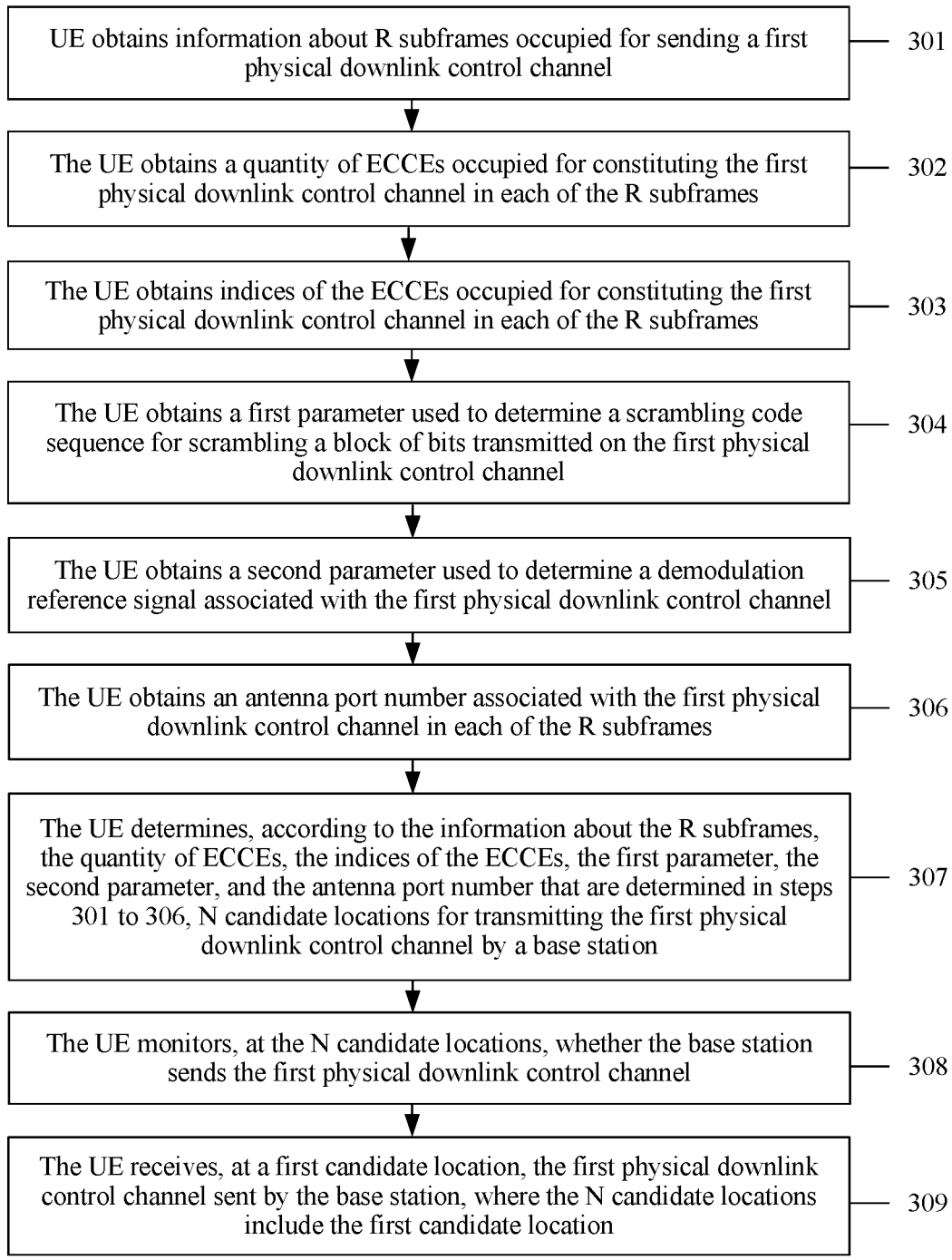
FIG. 3 is a schematic flowchart 3 of a physical downlink control channel transmission method according to an embodiment of the present invention.

An embodiment of the present invention provides a downlink control channel transmission method. As shown in FIG. 3, the method includes the following steps.

301. UE obtains information about R subframes occupied for sending a first physical downlink control channel.

302. The UE obtains a quantity of ECCEs constituting the first physical downlink control channel in each of the R subframes.

303. The UE obtains indices of the ECCEs constituting the first physical downlink control channel in each of the R subframes.

304. The UE obtains a first parameter used to determine a scrambling code sequence for scrambling a block of bits transmitted on the first physical downlink control channel.

305. The UE obtains a second parameter used to determine a demodulation reference signal associated with the first physical downlink control channel.

306. The UE obtains an antenna port number associated with the first physical downlink control channel in each of the R subframes.

307. The UE determines, according to the information about the R subframes, the quantity of ECCEs, the indices of the ECCEs, the first parameter, the second parameter, and the antenna port number that are determined in steps 301 to 306, N candidate locations for transmitting the first physical downlink control channel by a base station.

308. The UE monitors, at the N candidate locations, whether the base station sends the first physical downlink control channel.

309. The UE receives, at a first candidate location, the first physical downlink control channel sent by the base station, where the N candidate locations include the first candidate location.

Before the first physical downlink control channel (the first physical downlink control channel is used for sending same DCI in at least R subframes) is transmitted between the UE and the base station, the UE first needs to obtain the information indicating the R subframes occupied for transmitting the first physical downlink control channel, and the following parameters in each of the R subframes: the quantity of ECCEs constituting the first physical downlink control channel, the indices of the ECCEs, the first parameter used to determine the scrambling code sequence for scrambling the block of bits transmitted on the first physical downlink control channel, the second parameter used to determine the demodulation reference signal associated with the first physical downlink control channel, the antenna port number associated with the first physical downlink control channel, and a transmission type of the first physical downlink control channel.

Specifically, in step 301, the UE obtains the information about the R subframes occupied for sending the first physical downlink control channel. The information about the R subframes may be specifically location information of the R subframes, or location information of a start subframe of the R subframes. For example, the information about the R subframes includes a frame number of a radio frame to which the R subframes belong, and a frame number of the start subframe of the R subframes.

It should be noted that, in this embodiment of the present invention, the R subframes occupied for sending the first physical downlink control channel may be R consecutive subframes or R non-consecutive subframes. For example, in a TDD system, consecutive subframes may include both an uplink subframe and a downlink subframe. In this case, the R subframes occupied for sending the first physical downlink control channel may be R consecutive downlink subframes. Alternatively, frequency hopping may occur in the R subframes occupied for sending the first physical downlink control channel. For example, the first subframe of the R subframes is located on a first frequency domain resource, and the second subframe to the $R^{th}$ subframe are located on a second frequency domain resource. In this case, because handover between different frequency domain resources needs to additionally occupy a handover time (such as one subframe), the R subframes occupied for sending the first physical downlink control channel are R non-consecutive subframes not including the handover time.

Figure 4:
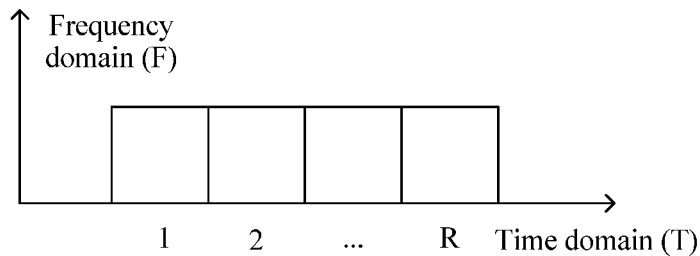
FIG. 4 is a schematic diagram 1 of locations that are on a time-frequency resource and that are of R subframes for a physical downlink control channel according to an embodiment of the present invention.

For example, the following embodiments are described by using R consecutive subframes as an example. For example, locations that are on a time-frequency resource and that are of the R subframes occupied by the first physical downlink control channel are shown in FIG. 4. The UE may obtain the location information of the R subframes or the location information of the start subframe of the R subframes by using configuration information delivered by the base station, so as to determine specific locations that are on the time-frequency resource and that are of the R subframes occupied for sending the first physical downlink control channel by the base station. Certainly, the UE may determine, according to a related protocol, the location information of the R subframes occupied for sending the first physical downlink control channel or the location information of the start subframe of the R subframes.

For example, it is assumed that R=100, a radio frame meeting a condition that SFN (that is, a system frame number) mod 100=0 is used as a start radio frame, and the first downlink subframe in the start radio frame is used as a start subframe of the R subframes. Alternatively, to avoid interference between different cells, a cell identity (that is, a cell ID) may be used as a preset parameter to determine a start radio frame of the R subframes and/or a start subframe of the R subframes. For example, a radio frame meeting a condition that (SFN mod 100)+(cell ID mod 100)=0 is used as the start radio frame, and the first downlink subframe in the start radio frame is used as the start subframe of the R subframes. Alternatively, to avoid interference between cells, an offset between start radio frames and/or start subframes in the cells is included in the configuration information sent by the base station. In this case, the UE determines a start radio frame of the R subframes and/or a start subframe of the R subframes according to a preset condition such as a condition that (SFN mod 100)+offset (offset)=0. In this way, for UEs in different cells, R subframes at different locations may be occupied for transmitting the first physical downlink control channel.

It can be learned that, according to the physical downlink control channel transmission method provided in this embodiment of the present invention, a first physical downlink control channel may be transmitted in R subframes. Therefore, compared with the prior art in which in one subframe (1 ms), UE needs to monitor multiple candidate EPDCCHs and attempt to decode each candidate EPDCCH in a candidate EPDCCH set according to configuration information, UE may receive the first physical downlink control channel in each of the R subframes, so that signal strength of receiving the first physical downlink control channel by the UE is enhanced. That is, performance of performing channel estimation on the first physical downlink control channel by the UE is improved by using a short-term correlation of a communication environment in the R subframes, and a time-domain diversity gain is obtained by using a long-term time-varying characteristic of the communication environment, to improve performance of monitoring the first physical downlink control channel by the UE.

Further, on a same frequency domain resource, multiple candidate locations may be set for the R subframes. In this case, the UE may further obtain location information of the R subframes or location information of a start subframe of the R subframes in any candidate location in the multiple candidate locations. A first offset exists between the $M^{th}$ candidate location and the $(M-1)^{th}$ candidate location, and M is an integer greater than 1.

Figure 5:
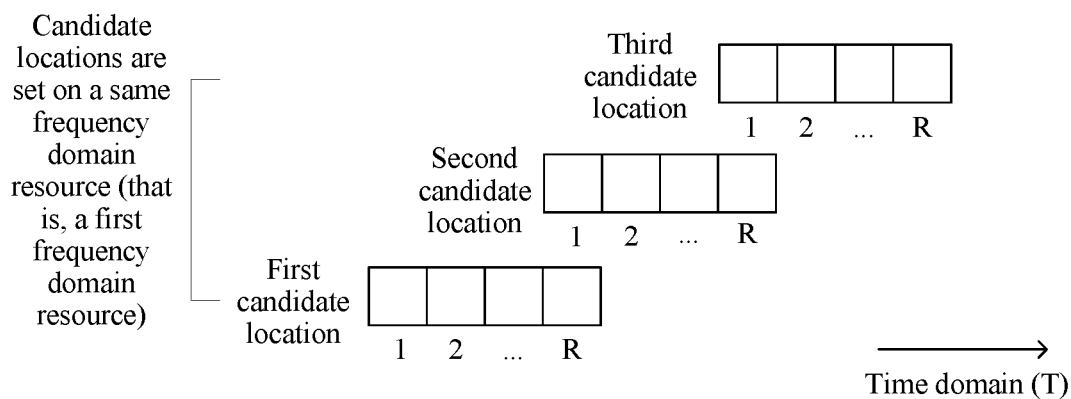
FIG. 5 is a schematic diagram 2 of locations that are on a time-frequency resource and that are of R subframes for a physical downlink control channel according to an embodiment of the present invention.

For example, as shown in FIG. 5, three candidate locations are set on a same first frequency domain resource. The three candidate locations each include R subframes. A method for determining a start radio frame of the R subframes in the first candidate location is the same as a method for determining a start radio frame in FIG. 4. The second candidate location is obtained after a first offset is added to the first candidate location. As shown in FIG. 5, a value of R is used as the first offset, and the third candidate location is obtained after the first offset is continuously added to the second candidate location.

In this case, if a first physical downlink control channel sent by the base station to UE1 occupies the R subframes in the first candidate location, a first physical downlink control channel sent by the base station to UE2 may occupy the R subframes in the second candidate location. In this case, the UE2 receives the first physical downlink control channel without waiting until the UE1 receives the first physical downlink control channel and sends a response to the base station.

Certainly, the first offset may be specified in a standard. Alternatively, the first offset, together with the information about the R subframes, may be sent to the UE by using the configuration information sent by the base station to the UE.

Furthermore, in the information about the R subframes occupied by the first physical downlink control channel, the value of R may be determined according to a format of the DCI carried on the first physical downlink control channel. That is, when formats of the DCI carried on the first physical downlink control channel are different, resources of the R subframes occupied for sending the first physical downlink control channel are different.

Figure 6:
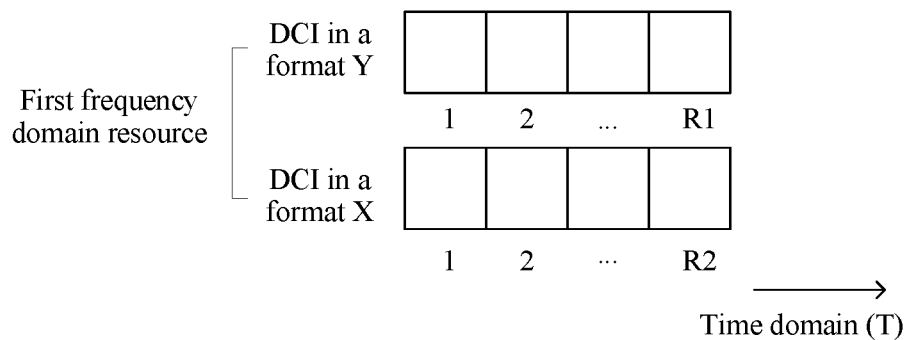
FIG. 6 is a schematic diagram 3 of locations that are on a time-frequency resource and that are of R subframes for a physical downlink control channel according to an embodiment of the present invention.

As shown in FIG. 6, on a same first frequency domain resource, if a first physical downlink control channel carries DCI in a format Y, a value of R1 in R1 subframes used by UE is smaller; or if a first physical downlink control channel carries DCI in a format X, a value of R2 in R2 subframes used by UE is larger. Information carried in the DCI in the format X is different from information carried in the DCI in the format Y, but a quantity of bits included in the DCI in the format X is the same as a quantity of bits included in the DCI in the format Y. Alternatively, a quantity of bits included in the DCI in the format X is different from a quantity of bits included in the DCI in the format Y, and the quantity of bits included in the DCI in the format X is greater than the quantity of bits included in the DCI in the format Y.

Particularly, when the DCI carried on the first physical downlink control channel includes scheduling information used to perform scheduling so that a paging message is transmitted on a PDSCH, the UE only needs to monitor the first physical downlink control channel according to information about the R subframes shown in FIG. 4 or FIG. 5.

When the DCI carried on the first physical downlink control channel includes scheduling information used to perform scheduling so that an RAR is transmitted on a PDSCH, or the DCI directly includes a part or all of information about an RAR, the UE only needs to monitor the first physical downlink control channel according to information about the R subframes shown in FIG. 4, FIG. 5, or FIG. 6.

When the DCI carried on the first physical downlink control channel includes the scheduling information used to perform scheduling so that the RAR is transmitted on the PDSCH, or the DCI directly includes a part or all of the information about the RAR, sizes of the DCI may be the same in the two cases, that is, the DCI carried on the first physical downlink control channel has two formats, but quantities of bits included in the DCI in the two formats are the same. For example, the DCI in the format X includes the scheduling information used to perform scheduling so that the RAR is transmitted on the PDSCH, and the DCI in the format Y directly includes a part or all of the information about the RAR. In this case, the UE first determines the format of the DCI carried on the first physical downlink control channel. If the DCI is in the format X, the UE decodes the PDSCH according to the scheduling information included in the DCI. If the DCI is in the format Y, the UE directly obtains a part or all of the information about the RAR from the DCI.

A method for determining, by the UE, the format of the DCI carried on the first physical downlink control channel is described in detail in the subsequent embodiment. Details are not described herein.

In addition, after obtaining the information about the R subframes occupied for sending the first physical downlink control channel, the UE may further obtain information about P subframes occupied for sending the first physical downlink control channel. A location of a start subframe of the P subframes is the same as a location of the start subframe of the R subframes, that is, a time domain location and a frequency domain location of the start subframe of the P subframes are the same as those of the start subframe of the R subframes. In addition, DCI sent on the first physical downlink control channel in the P subframes is the same as the DCI sent in the R subframes, P is an integer greater than or equal to 1, and P is not equal to R.

Figure 7:
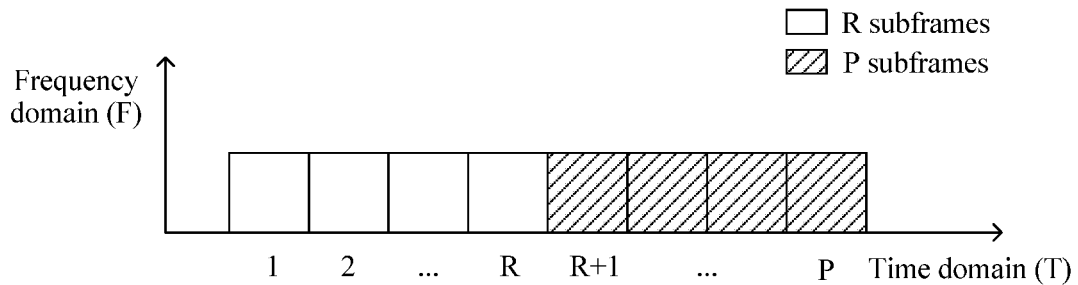
FIG. 7 is a schematic diagram of locations that are on a time-frequency resource and that are of R subframes and P subframes for a physical downlink control channel according to an embodiment of the present invention.

That is, the UE may obtain the information about the R subframes and the information about the P subframes. The R subframes and the P subframes are all used to send the first physical downlink control channel. Based on the locations of the R subframes on the time-frequency resource shown in FIG. 4, as shown in FIG. 7, it is assumed that R=T, and P=2T, T is an integer greater than 0, R and P are respectively corresponding to a first coverage enhancement level and a second coverage enhancement level, a start subframe of the R subframes is the same as a start subframe of the P subframes, and the P subframes include time-frequency resources of the R subframes. In this way, for UEs that are located at different coverage enhancement levels, different quantities of subframes may be set for sending the first physical downlink control channel.

In addition, if the base station sends the first physical downlink control channel by using the P subframes, but actually the UE can successfully decode the first physical downlink control channel provided that the UE receives the first physical downlink control channel sent by using the R subframes corresponding to the first coverage enhancement level. Therefore, the UE only needs to receive the first physical downlink control channel sent by using the R subframes rather than the P subframes.

It should be noted that a schematic diagram of locations of R subframes on a time-frequency resource shown in FIG. 5 or FIG. 6 may also include locations of the P subframes on a time-frequency resource. Details are not described in this embodiment of the present invention.

In step 302, the UE obtains the quantity of ECCEs constituting the first physical downlink control channel in each of the R subframes.

Specifically, the UE may obtain a transmission set for transmitting the first physical downlink control channel. The transmission set specifically includes one or more of the following parameters: a quantity of PRBs occupied for transmitting the first physical downlink control channel, the format of the DCI, a type of a cyclic prefix (CP), or a frame structure type. The frame structure type includes a first frame structure type or a second frame structure type. The first frame structure type is applied to an frequency division duplex (FDD) system. The second frame structure type is applied to a time division duplex (TDD) system. Then, the UE determines, according to the transmission set, the quantity of ECCEs constituting the first physical downlink control channel.

For example, the UE may determine, according to the transmission set, a quantity of ECCEs constituting the first physical downlink control channel in a first subframe of the R subframes (the first subframe is any one of the R subframes). Then, the UE determines, according to a first preset rule and the quantity of ECCEs constituting the first physical downlink control channel in the first subframe, a quantity of ECCEs constituting the first physical downlink control channel in each of R−1 other subframes in the R subframes.

Specifically, the first preset rule may be as follows: The quantity of ECCEs constituting the first physical downlink control channel in each of the R−1 other subframes in the R subframes is the same as the quantity of ECCEs constituting the first physical downlink control channel in the first subframe, or a functional relationship exists between the quantity of ECCEs constituting the first physical downlink control channel in each of the R−1 other subframes in the R subframes and the quantity of ECCEs constituting the first physical downlink control channel in the first subframe. Persons skilled in the art may perform setting according to actual experience.

For example, the first subframe may be set to the start subframe of the R subframes. For a quantity of ECCEs constituting the first physical downlink control channel in each subframe from the second subframe to the $R^{th}$ subframe of the R subframes, refer to the quantity of ECCEs constituting the first physical downlink control channel in the start subframe. For example, the quantity of ECCEs constituting the first physical downlink control channel in each subframe from the second subframe to the $R^{th}$ subframe is the same as the quantity of ECCEs constituting the first physical downlink control channel in the start subframe.

Certainly, the UE may determine, according to the configuration information sent by the base station, the quantity of ECCEs constituting the first physical downlink control channel in each of the R subframes. For example, the configuration information includes a quantity of ECCEs constituting the first physical downlink control channel in a first subframe. Then, the UE determines, according to a first preset rule and the quantity of ECCEs constituting the first physical downlink control channel in the first subframe, a quantity of ECCEs constituting the first physical downlink control channel in each of R−1 other subframes in the R subframes.

For example, if the quantity of ECCEs constituting the first physical downlink control channel in the first subframe is 16 or 24, and the R−1 other subframes include a first-type special subframe, a quantity of ECCEs constituting the first physical downlink control channel in the first-type special subframe is 12 or is less than 12.

The first-type special subframe is a corresponding special subframe when a configuration of the special subframe (configuration of special subframe) in the second frame structure type is 1, 2, 6, 7, or 9. Specifically, each configuration of a special subframe includes three parts, that is, a downlink pilot timeslot DwPTS (downlink pilot timeslot), a guard period GP (guard period), and an uplink pilot timeslot UpPTS (uplink pilot timeslot), and a total length of the three parts is 1 ms. For example, when a configuration of a special subframe is 1, if a normal CP is configured in a downlink, a DwPTS of the special subframe includes 19760 OFDM symbols; or if an extended CP is configured in a downlink, a DwPTS of the special subframe includes 20480 OFDM symbols.

If the first subframe is a first-type special subframe, the quantity of ECCEs constituting the first physical downlink control channel in the first subframe is 12, and the R−1 other subframes include a normal subframe, a quantity of ECCEs constituting the first physical downlink control channel in the normal subframe is 12, 24, or 16. If the R−1 other subframes further include a first-type special subframe, a quantity of ECCEs constituting the first physical downlink control channel in the first-type special subframe may still be determined according to the first preset rule.

In step 303, the UE determines, according to the quantity of ECCEs constituting the first physical downlink control channel in each of the R subframes, the indices of the ECCEs occupied for constituting the first physical downlink control channel.

For example, the UE may determine indices of the ECCEs in the first subframe according to a quantity of candidate locations for sending the first physical downlink control channel in the first subframe, a quantity of ECCEs included in the first subframe, and the quantity that is of ECCEs constituting the first physical downlink control channel in the first subframe and that is determined in step 302. Then, the UE determines indices of the ECCEs in each of the R−1 other subframes in the R subframes according to a second preset rule and the indices of the ECCEs in the first subframe.

Certainly, the UE may determine, according to the configuration information sent by the base station, the indices of the ECCEs constituting the first physical downlink control channel in each of the R subframes. For example, the configuration information includes indices of the ECCEs constituting the first physical downlink control channel in the first subframe. Then, the UE determines indices of the ECCEs in each of the R−1 other subframes in the R subframes according to a second preset rule and the indices of the ECCEs occupied for constituting the first physical downlink control channel in the first subframe.

Similar to step 302, the second preset rule may be as follows: The indices of the ECCEs constituting the first physical downlink control channel in each of the R−1 other subframes in the R subframes are the same as the indices of the ECCEs constituting the first physical downlink control channel in the first subframe, or a functional relationship exists between the indices of the ECCEs constituting the first physical downlink control channel in each of the R−1 other subframes and the indices of the ECCEs constituting the first physical downlink control channel in the first subframe. Persons skilled in the art may perform setting according to actual experience.

For example, the UE may first determine indices of the ECCEs in the start subframe of the R subframes. Then, for indices of the ECCEs corresponding to the first physical downlink control channel in each subframe from the second subframe to the $R^{th}$ subframe, refer to the indices of the ECCEs in the start subframe. For example, the indices of the ECCEs corresponding to the first physical downlink control channel in each subframe from the second subframe to the $R^{th}$ subframe are the same as the indices of the ECCEs in the start subframe.

Particularly, for the second frame structure type, if the start subframe is a first-type special subframe, and the quantity of ECCEs constituting the first physical downlink control channel is 12, when 24 ECCEs are used in a normal subframe, indices of the ECCEs are corresponding to all the 24 ECCEs. Alternatively, when 12 ECCEs are used in a normal subframe, the normal subframe includes two index sets. One of the index sets is the same as a corresponding ECCE index set in the start subframe, and the index set is used in the normal subframe by default, or the two index sets respectively indicate two candidate locations for sending the first physical downlink control channel in the subframe.

In step 304, the UE obtains the first parameter used to determine the scrambling code sequence for scrambling the block of bits transmitted on the first physical downlink control channel.

When the first physical downlink control channel is mapped to physical resource blocks PRBs included in two EPDCCH configuration sets (EPDCCH-setconfig), the UE determines the first parameter according to parameters that are in the two EPDCCH configuration sets and that are respectively used to determine a scrambling code sequence.

For example, the EPDCCH configuration set may include at least one of the following parameters: an ID of the EPDCCH configuration set, a transmission type (transmission type) of the first physical downlink control channel, a quantity of PRB pairs occupied by the first physical downlink control channel in the first subframe, locations of the occupied PRB pairs on a frequency domain resource, or an initialization parameter of a scrambling code sequence of a demodulation reference signal DMRS.

Specifically, if the configuration information sent by the base station includes the two EPDCCH configuration sets, and the first physical downlink control channel occupies PRBs in the two EPDCCH configuration sets, the bits transmitted on the first physical downlink control channel are scrambled by using a scrambling code sequence. An initial value of a scrambling code sequence generator may be generated by default according to a third preset rule by using a first parameter in either of the two EPDCCH configuration sets. The third preset rule may be specifically as follows: A parameter that is in a first EPDCCH configuration set and that is used to determine a scrambling code sequence for scrambling a block of bits transmitted on the first physical downlink control channel is used, or a parameter that is in an EPDCCH configuration set including a larger or smaller quantity of PRBs and that is used to determine a scrambling code sequence for scrambling a block of bits transmitted on the first physical downlink control channel is used.

In the two EPDCCH configuration sets, one EPDCCH configuration set may include two PRBs, and the other EPDCCH configuration set may include four PRBs. Alternatively, the two EPDCCH configuration sets each include two PRBs. The two EPDCCH configuration sets include same indication information indicating transmission manners of the first physical downlink control channel, that is, indicating that both of the transmission manners are localized transmission or distributed transmission.

Further, if the DCI carried on the first physical downlink control channel is associate with a cell-specific message, an initial value of the scrambling code sequence is generated according to the following formula by using the first parameter:

$$c_{init}=\lfloor n_s/2 \rfloor \cdot 2^9 + A, \text{ where}$$

A is the first parameter explicitly indicated in a protocol, $c_{init}$ is the initial value of the scrambling code sequence, and $n_s$ is a timeslot number corresponding to a start subframe for sending the first physical downlink control channel.

In addition, values of the first parameter may be different when the DCI includes scheduling information used to perform scheduling so that a paging message is sent on a PDSCH, or when the DCI includes a scheduling information used to schedule an RAR sent on a PDSCH, or when the DCI directly includes a part or all of information about an RAR.

For example, when the DCI includes the scheduling information used to perform scheduling so that the paging message is sent on the PDSCH, the first parameter may be a specific radio network temporary identifier for scrambling CRC included in the DCI. When the DCI includes the scheduling information used to perform scheduling so that the RAR is sent on the PDSCH, or the DCI directly includes a part or all of the information about the RAR, the first parameter may be a specific radio network temporary identifier for scrambling CRC included in the DCI.

In step 305, the UE obtains the second parameter used to determine the demodulation reference signal associated with the first physical downlink control channel.

Similar to determining the first parameter in step 304, when the first physical downlink control channel is mapped to physical resource blocks PRBs included in two EPDCCH configuration sets, the UE determines the second parameter according to a fourth preset rule and parameters that are in the two EPDCCH configuration sets and that are respectively used to determine a demodulation reference signal.

Similarly, the fourth preset rule may be specifically as follows: A parameter that is in a first EPDCCH configuration set and that is used to determine a demodulation reference signal associated with the first physical downlink control channel is used, or a parameter that is in an EPDCCH configuration set including a larger or smaller quantity of PRBs and that is used to determine a demodulation reference signal associated with the first physical downlink control channel is used.

For example, for any antenna port number in {107, 108, 109, 110}, a demodulation reference signal sequence is generated according to a pseudo-random sequence, for example, $$r(m) = \frac{1}{\sqrt{2}}(1 - 2 \cdot c(2m)) + j\frac{1}{\sqrt{2}}(1 - 2 \cdot c(2m + 1)),$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}.$$

A pseudo-random sequence c(n) generator needs to be initialized, and an initialization value is generated according to the fourth preset rule by using the second parameter. For example, if the carried DCI is associate with a common message, an initial value of the pseudo-random sequence is $c_{init}=(\lfloor n_s/2 \rfloor+1) \cdot (2B+1) \cdot 2^{16} + n_{SCID}^{EPDCCH}$, where B is the second parameter configured by a higher layer or preset in a protocol, $n_s$ is a timeslot number or a timeslot number corresponding to a start subframe for sending the first physical downlink control channel, and $n_{SCID}^{EPDCCH}$ is a parameter preset in the protocol.

In addition, values of the second parameter may be different when the DCI includes scheduling information used to perform scheduling so that a paging message is sent on a PDSCH, or when the DCI includes scheduling information used to perform scheduling so that an RAR is sent on a PDSCH, or when the DCI directly includes a part or all of information about an RAR.

In step 306, the UE obtains the antenna port number associated with the first physical downlink control channel in each of the R subframes.

Specifically, if the DCI carried on the first physical downlink control channel is used to schedule a cell-specific message, and a normal cyclic prefix is configured in an LTE system, the associated antenna port number is a number in {107, 108, 109, 110}.

If the DCI carried on the first physical downlink control channel is used to schedule a cell-specific message, and an extended cyclic prefix is configured in an LTE system, the associated antenna port number is a number in {107,108}.

If the DCI carried on the first physical downlink control channel is used to schedule a UE-specific message, configuration in an LTE system may be specifically classified into a normal cyclic prefix and an extended cyclic prefix.

If the normal cyclic prefix is configured in the LTE system, when the R subframes include a normal subframe and a first-type special subframe, the UE determines that the associated antenna port number is a number in {107, 109}.

If the normal cyclic prefix is configured in the LTE system, when the R subframes do not include a first-type special subframe (that is, all the R subframes are normal subframes, or the R subframes include a normal subframe and a second-type special subframe), the UE determines that the associated antenna port number is a number in {107, 108, 109, 110}. The second-type special subframe is a corresponding special subframe when a configuration of the special subframe in the second frame structure type is 3, 4, or 8.

If the extended cyclic prefix is configured in the LTE system, the UE determines that the associated antenna port number is a number in {107,109}.

Further, if the DCI carried on the first physical downlink control channel is used to schedule the UE-specific message, and the R subframes include the normal subframe and the first-type special subframe, when the normal cyclic prefix is configured in the LTE system, the UE determines the associated antenna port in {107, 109} according to a lowest ECCE index used in the first physical downlink control channel, the quantity of ECCEs constituting the first physical downlink control channel, and a quantity of ECCEs carried in a PRB pair in the first-type special subframe.

Correspondingly, if the DCI carried on the first physical downlink control channel is used to schedule the UE-specific message, and the R subframes do not include the first-type special subframe, when the normal cyclic prefix is configured in the LTE system, the UE determines the associated antenna port in {107, 108, 109, 110} according to a lowest ECCE index used in the first physical downlink control channel, the quantity of ECCEs constituting the first physical downlink control channel, and a quantity of ECCEs included in a PRB pair in the normal subframe.

At this point, by using steps 301 to 306, the UE obtains the information about the R subframes occupied for transmitting the first physical downlink control channel, and the following parameters in each of the R subframes: the quantity of ECCEs constituting the first physical downlink control channel, the indices of the ECCEs, the first parameter used to determine the scrambling code sequence for scrambling the block of bits transmitted on the first physical downlink control channel, the second parameter used to determine the demodulation reference signal associated with the first physical downlink control channel, and the associated antenna port number.

It should be noted that one or more of the parameters obtained in steps 301 to 306 may be carried in the configuration information sent by the base station to the UE, or may be obtained by the UE according to a pre-stored rule or a protocol. This is not limited in the present invention. In addition, a sequence of performing steps 301 to 306 is not limited in this embodiment of the present invention.

Further, in step 307, the UE determines, according to the parameters obtained in steps 301 to 306, the N candidate locations for transmitting the first physical downlink control channel by the base station. Each of the N candidate locations includes the R subframes.

Further, in step 308, the UE monitors, at each candidate location determined in step 307, whether the base station sends the first physical downlink control channel, until the UE correctly receives, in step 309 at the first candidate location, the first physical downlink control channel sent by the base station in the R subframes. The N candidate locations include the first candidate location.

Further, after the UE receives, at the first candidate location, the first physical downlink control channel sent by the base station, the UE may further determine a specific format of the DCI carried on the first physical downlink control channel sent by the base station. The format of the DCI herein includes at least two types, that is, a first DCI format and a second DCI format. DCI in the first DCI format includes scheduling information used to schedule a PDSCH. DCI in the second DCI format includes a part or all of information about an RAR.

Specifically, the UE may determine the format of the DCI according to information about a first bit in the DCI carried on the first physical downlink control channel.

Alternatively, the UE may determine the format of the DCI according to a scrambling code for scrambling CRC. The CRC is CRC attached to the DCI carried on the first physical downlink control channel (CRC attachment). For example, after scrambling CRC (that is, scrambling the CRC by multiplying a pseudo-random sequence by a bit corresponding to the CRC, where different scrambling manners may be used for DCI in different formats), the base station obtains a scrambling code for the CRC, and then attaches the scrambling code for the CRC to a bit following the DCI. In this way, after receiving the first physical downlink control channel, the UE may determine the format of the DCI according to the scrambling code for the CRC in the bit following the DCI carried on the first physical downlink control channel.

Alternatively, the UE may determine the format of the DCI according to at least one of the quantity R of subframes occupied for sending the first physical downlink control channel, a quantity of ECCEs constituting the first physical downlink control channel, or indices of the ECCEs constituting the first physical downlink control channel.

At this point, according to the downlink control channel transmission method provided in this embodiment of the present invention, UE obtains a parameter set for transmitting a first physical downlink control channel, and determines, according to the parameter set, N candidate locations for transmitting the first physical downlink control channel by a base station. Each candidate location includes the R subframes, and same DCI is included in the R subframes. That is, according to the physical downlink control channel transmission method provided in this embodiment of the present invention, the first physical downlink control channel may be transmitted in the R subframes. Therefore, compared with the prior art in which in one subframe (1 ms), UE needs to monitor multiple candidate EPDCCHs and attempt to decode each candidate EPDCCH in a candidate EPDCCH set according to configuration information, the UE may receive the first physical downlink control channel in each of the R subframes, so that signal strength of receiving the first physical downlink control channel by the UE is enhanced.

Embodiment 3

Figure 8:
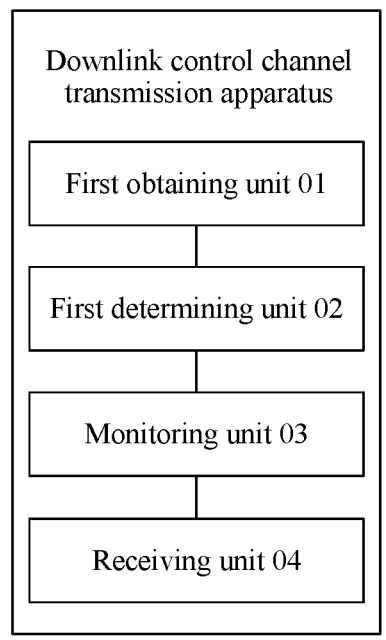
FIG. 8 is a schematic structural diagram 1 of a physical downlink control channel transmission apparatus according to an embodiment of the present invention.

FIG. 8 is a schematic structural diagram of a downlink control channel transmission apparatus according to an embodiment of the present invention. The downlink control channel transmission apparatus provided in this embodiment of the present invention may be configured to perform the methods implemented in the embodiments of the present invention shown in FIG. 1 to FIG. 7. For ease of description, only a part related to this embodiment of the present invention is shown. For specific technical details that are not disclosed, refer to the embodiments of the present invention shown in FIG. 1 to FIG. 7.

Specifically, as shown in FIG. 8, the downlink control channel transmission apparatus includes: a first obtaining unit 01, configured to obtain a parameter set for transmitting a first physical downlink control channel, where the first physical downlink control channel is used for sending same downlink control information DCI in at least R subframes, and R is an integer greater than or equal to 1; a first determining unit 02, configured to determine, according to the parameter set, N candidate locations for transmitting the first physical downlink control channel by a base station, where the candidate location includes the R subframes, and N is an integer greater than or equal to 1; a monitoring unit 03, configured to monitor, at the N candidate locations, whether the base station sends the first physical downlink control channel; and a receiving unit 04, configured to receive, at a first candidate location, the first physical downlink control channel sent by the base station, where the N candidate locations include the first candidate location.

The parameter set includes information indicating the R subframes occupied for transmitting the first physical downlink control channel, and the following parameters in each of the R subframes: a quantity of enhanced control channel elements ECCEs constituting the first physical downlink control channel, indices of the ECCEs, a first parameter used to determine a scrambling code sequence for scrambling a block of bits transmitted on the first physical downlink control channel, a second parameter used to determine a demodulation reference signal associated with the first physical downlink control channel, an antenna port number associated with the first physical downlink control channel, and a transmission type of the first physical downlink control channel.

Further, the first obtaining unit 01 is specifically configured to obtain location information of the R subframes or location information of a start subframe of the R subframes at each candidate location.

Multiple candidate locations are set for the R subframes on a same frequency domain resource, a first offset exists between the $M^{th}$ candidate location and the $(M-1)^{th}$ candidate location, and M is an integer greater than 1.

The first determining unit 02 is further configured to determine a format of the DCI carried on the first physical downlink control channel.

The first obtaining unit 01 is specifically configured to obtain location information of the R subframes or location information of a start subframe of the R subframes according to the format of the DCI.

Further, the first obtaining unit 01 is specifically configured to obtain a transmission set for transmitting the first physical downlink control channel. The transmission set includes one or more of a quantity of PRBs occupied for transmitting the first physical downlink control channel, the format of the DCI, a type of a cyclic prefix CP, or a frame structure type. The frame structure type includes a first frame structure type or a second frame structure type.

The first determining unit 02 is further configured to determine, according to the transmission set, the quantity of ECCEs constituting the first physical downlink control channel.

Further, the first determining unit 02 is specifically configured to: determine, according to the transmission set, a quantity of ECCEs constituting the first physical downlink control channel in a first subframe of the R subframes, where the first subframe is any one of the R subframes; and determine, according to a first preset rule and the quantity of ECCEs constituting the first physical downlink control channel in the first subframe, a quantity of ECCEs constituting the first physical downlink control channel in each of R−1 other subframes than the first subframe of the R subframes.

The first determining unit 02 is further configured to: determine indices of the ECCEs in the first subframe of the R subframes according to the quantity of ECCEs constituting the first physical downlink control channel in the first subframe, a quantity of candidate locations for sending the first physical downlink control channel in the first subframe, and a quantity of ECCEs included in the first subframe; and determine indices of the ECCEs in each of the R−1 other subframes than the first subframe of the R subframes according to a second preset rule and the indices of the ECCEs in the first subframe.

The first determining unit 02 is further configured to: when the first physical downlink control channel is mapped to physical resource blocks PRBs included in two EPDCCH configuration sets, determine the first parameter according to parameters that are in the two EPDCCH configuration sets and that are respectively used to determine a scrambling code sequence.

The first determining unit 02 is further configured to: when the first physical downlink control channel is mapped to physical resource blocks PRBs included in two EPDCCH configuration sets, determine the second parameter according to parameters that are in the two EPDCCH configuration sets and that are respectively used to determine a demodulation reference signal.

The first determining unit 02 is further configured to: if the DCI carried on the first physical downlink control channel is used to schedule a cell-specific message, and a normal cyclic prefix is configured in an LTE system, determine that the associated antenna port number is a number in {107, 108, 109, 110}; if the DCI carried on the first physical downlink control channel is used to schedule a cell-specific message, and an extended cyclic prefix is configured in an LTE system, determine that the associated antenna port number is a number in {107, 108}; if the DCI carried on the first physical downlink control channel is used to schedule a UE-specific message, and a normal cyclic prefix is configured in an LTE system, when the R subframes include a normal subframe and a first-type special subframe, determine that the associated antenna port number is a number in {107,109}; if the DCI carried on the first physical downlink control channel is used to schedule a UE-specific message, and a normal cyclic prefix is configured in an LTE system, when the R subframes do not include a first-type special subframe, determine that the associated antenna port number is a number in {107, 108, 109, 110}; or if the DCI carried on the first physical downlink control channel is used to schedule a UE-specific message, and an extended cyclic prefix is configured in an LTE system, determine that the associated antenna port number is a number in {107,109}.

The receiving unit 03 is further configured to receive configuration information sent by the base station.

The configuration information includes the information indicating the R subframes occupied for sending the first physical downlink control channel. Alternatively, the configuration information includes the information indicating the R subframes occupied for sending the first physical downlink control channel, and at least one of the following parameters in at least one of the R subframes: a quantity of ECCEs constituting the first physical downlink control channel, indices of the ECCEs, a first parameter used to determine a scrambling code sequence for scrambling a block of bits transmitted on the first physical downlink control channel, a second parameter used to determine a demodulation reference signal associated with the first physical downlink control channel, an associated antenna port number, or a transmission type of the first physical downlink control channel.

The first determining unit 02 is further configured to: determine the format of the DCI according to information about a first bit in the DCI carried on the first physical downlink control channel; or determine the format of the DCI according to a scrambling code for scrambling CRC, where the CRC is CRC attached to the DCI carried on the first physical downlink control channel; or determine the format of the DCI according to at least one of the quantity R of subframes occupied for sending the first physical downlink control channel, a quantity of ECCEs constituting the first physical downlink control channel, or indices of the ECCEs constituting the first physical downlink control channel.

The format of the DCI includes a first DCI format and a second DCI format, DCI in the first DCI format includes scheduling information used for scheduling a physical downlink shared channel PDSCH, and DCI in the second DCI format includes a part or all of information about a random access response RAR.

Figure 9:
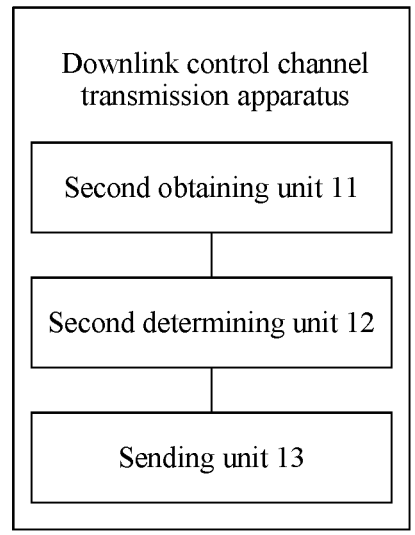
FIG. 9 is a schematic structural diagram 2 of a physical downlink control channel transmission apparatus according to an embodiment of the present invention.

FIG. 9 is a schematic structural diagram of another downlink control channel transmission apparatus according to an embodiment of the present invention. The downlink control channel transmission apparatus provided in this embodiment of the present invention may be configured to perform the methods implemented in the embodiments of the present invention shown in FIG. 1 to FIG. 7. For ease of description, only a part related to this embodiment of the present invention is shown. For specific technical details that are not disclosed, refer to the embodiments of the present invention shown in FIG. 1 to FIG. 7.

Specifically, as shown in FIG. 9, the downlink control channel transmission apparatus includes: a second obtaining unit 11, configured to obtain a parameter set for transmitting a first physical downlink control channel, where the first physical downlink control channel is used for sending same downlink control information DCI in at least R subframes, and R is an integer greater than or equal to 1; a second determining unit 12, configured to: determine, according to the parameter set, N candidate locations for sending the first physical downlink control channel to UE, where the candidate location includes the R subframes, and N is an integer greater than or equal to 1; and determine a first candidate location in the N candidate locations as a location for sending the first physical downlink control channel to the UE; and a sending unit 13, configured to send the first physical downlink control channel to the UE at the first candidate location.

The parameter set includes information indicating the R subframes occupied for transmitting the first physical downlink control channel, and the following parameters in each of the R subframes: a quantity of enhanced control channel elements ECCEs constituting the first physical downlink control channel, indices of the ECCEs, a first parameter used to determine a scrambling code sequence for scrambling a block of bits transmitted on the first physical downlink control channel, a second parameter used to determine a demodulation reference signal associated with the first physical downlink control channel, an antenna port number associated with the first physical downlink control channel, and a transmission type of the first physical downlink control channel.

The sending unit 13 is further configured to send configuration information to the UE.

The configuration information includes the information indicating the R subframes occupied for sending the first physical downlink control channel. Alternatively, the configuration information includes the information indicating the R subframes occupied for sending the first physical downlink control channel, and at least one of the following parameters in at least one of the R subframes: a quantity of ECCEs constituting the first physical downlink control channel, indices of the ECCEs, a first parameter used to determine a scrambling code sequence for scrambling a block of bits transmitted on the first physical downlink control channel, a second parameter used to determine a demodulation reference signal associated with the first physical downlink control channel, an antenna port number associated with the first physical downlink control channel, or a transmission type of the first physical downlink control channel.

At this point, according to the downlink control channel transmission apparatus provided in this embodiment of the present invention, UE obtains a parameter set for transmitting a first physical downlink control channel, and determines, according to the parameter set, N candidate locations for transmitting the first physical downlink control channel by a base station. Each candidate location includes the R subframes, and same DCI is included in the R subframes. That is, according to the physical downlink control channel transmission apparatus provided in this embodiment of the present invention, the first physical downlink control channel may be transmitted in the R subframes. Therefore, compared with the prior art in which in one subframe (1 ms), UE needs to monitor multiple candidate EPDCCHs and attempt to decode each candidate EPDCCH in a candidate EPDCCH set according to configuration information, the UE may receive the first physical downlink control channel in each of the R subframes, so that signal strength of receiving the first physical downlink control channel by the UE is enhanced.

Embodiment 4

Figure 10:
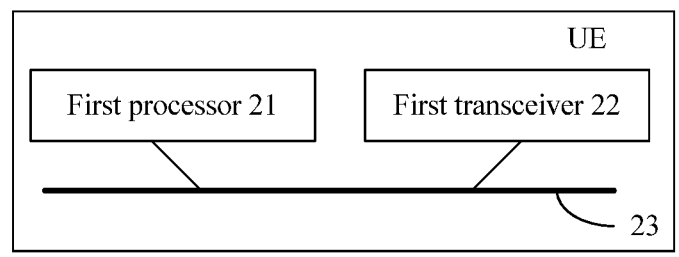
FIG. 10 is a schematic structural diagram of an entity of UE according to an embodiment of the present invention.

FIG. 10 is a schematic structural diagram of another downlink control channel transmission apparatus according to an embodiment of the present invention. The downlink control channel transmission apparatus provided in this embodiment of the present invention may be configured to perform the methods implemented in the embodiments of the present invention shown in FIG. 1 to FIG. 7. For ease of description, only a part related to this embodiment of the present invention is shown. For specific technical details that are not disclosed, refer to the embodiments of the present invention shown in FIG. 1 to FIG. 7.

The downlink control channel transmission apparatus may be specifically user equipment UE, such as a mobile phone, an intelligent terminal, a multimedia device, or a streaming media device.

For example, the UE includes a first processor 21, a first transceiver 22, and a bus 23. The first processor 21 and the first transceiver 22 may be connected and perform communication by using the bus 23.

Specifically, in the UE provided in this embodiment of the present invention, the first processor 21 is configured to: obtain a parameter set for transmitting a first physical downlink control channel, where the first physical downlink control channel is used for sending same downlink control information DCI in at least R subframes, and R is an integer greater than or equal to i; and determine, according to the parameter set, N candidate locations for transmitting the first physical downlink control channel by a base station, where the candidate location includes the R subframes, and N is an integer greater than or equal to i. In addition, the first processor 21 monitors, at the N candidate locations by using the first transceiver 22, whether the base station sends the first physical downlink control channel. The first transceiver 22 is further configured to receive, at a first candidate location, the first physical downlink control channel sent by the base station, where the N candidate locations include the first candidate location.

The parameter set includes information indicating the R subframes occupied for transmitting the first physical downlink control channel, and the following parameters in each of the R subframes: a quantity of enhanced control channel elements ECCEs constituting the first physical downlink control channel, indices of the ECCEs, a first parameter used to determine a scrambling code sequence for scrambling a block of bits transmitted on the first physical downlink control channel, a second parameter used to determine a demodulation reference signal associated with the first physical downlink control channel, an antenna port number associated with the first physical downlink control channel, and a transmission type of the first physical downlink control channel.

Further, the information about the R subframes that is obtained by the first processor 21 may be specifically location information of the R subframes or location information of a start subframe of the R subframes.

Further, multiple candidate locations are set for the R subframes on a same frequency domain resource. In this case, that the first processor 21 obtains information about the R subframes occupied for sending the first physical downlink control channel may specifically include the following step: the first processor 21 may obtain, from the base station by using the first transceiver 22, location information of the R subframes or location information of a start subframe of the R subframes at each candidate location. A first offset exists between the Mth candidate location and the (M−1)th candidate location, and M is an integer greater than 1.

Alternatively, that the first processor 21 obtains information about the R subframes occupied for sending the first physical downlink control channel may specifically include the following steps: the first processor 21 determines a format of the DCI carried on the first physical downlink control channel, and the first processor 21 obtains the location information of the R subframes or the location information of the start subframe of the R subframes according to the format of the DCI.

The parameter set obtained by the first processor 21 may further include information indicating P subframes occupied for sending the first physical downlink control channel. A location of a start subframe of the P subframes is the same as a location of the start subframe of the R subframes, DCI sent on the first physical downlink control channel in the P subframes is the same as the DCI sent in the R subframes, P is an integer greater than or equal to 1, and P is not equal to R.

Further, that the first processor 21 obtains a quantity of ECCEs constituting the first physical downlink control channel in each of the R subframes may specifically include the following steps: the first processor 21 obtains a transmission set for transmitting the first physical downlink control channel, where the transmission set includes one or more of a quantity of PRBs occupied for transmitting the first physical downlink control channel, the format of the DCI, a type of a cyclic prefix CP, or a frame structure type, and the frame structure type includes a first frame structure type or a second frame structure type; and the first processor 21 determines, according to the transmission set, the quantity of ECCEs constituting the first physical downlink control channel.

That the first processor 21 determines, according to the transmission set, the quantity of ECCEs constituting the first physical downlink control channel may specifically include the following steps: the first processor 21 determines, according to the transmission set, a quantity of ECCEs constituting the first physical downlink control channel in a first subframe of the R subframes, where the first subframe is any one of the R subframes; and the first processor 21 determines, according to a first preset rule and the quantity of ECCEs constituting the first physical downlink control channel in the first subframe, a quantity of ECCEs constituting the first physical downlink control channel in each of R−1 other subframes than the first subframe of the R subframes.

Alternatively, the first processor 21 may further receive, by using the first transceiver 22, a quantity that is of ECCEs constituting the first physical downlink control channel in a first subframe of the R subframes and that is sent by the base station, where the first subframe is any one of the R subframes; and the first processor 21 determines, according to a first preset rule and the quantity of ECCEs constituting the first physical downlink control channel in the first subframe, a quantity of ECCEs constituting the first physical downlink control channel in each of R−1 other subframes than the first subframe of the R subframes.

For example, the first subframe may be set to the start subframe of the R subframes. For a quantity of ECCEs constituting the first physical downlink control channel in each subframe from the second subframe to the Rth subframe of the R subframes, refer to the quantity of ECCEs constituting the first physical downlink control channel in the start subframe. For example, the quantity of ECCEs constituting the first physical downlink control channel in each subframe from the second subframe to the Rth subframe is the same as the quantity of ECCEs constituting the first physical downlink control channel in the start subframe.

Particularly, if the quantity of ECCEs constituting the first physical downlink control channel in the first subframe is 16 or 24, and the R−1 other subframes include a first-type special subframe, a quantity of ECCEs constituting the first physical downlink control channel in the first-type special subframe is 12 or is less than 12.

Alternatively, if the first subframe is a first-type special subframe, the quantity of ECCEs constituting the first physical downlink control channel in the first subframe is 12, and the R−1 other subframes include a normal subframe, a quantity of ECCEs constituting the first physical downlink control channel in the normal subframe is 12, 24, or 16.

The first-type special subframe is a corresponding special subframe when a configuration of the special subframe in the second frame structure type is 1, 2, 6, 7, or 9.

Further, that the first processor 21 obtains indices of the ECCEs constituting the first physical downlink control channel in each of the R subframes may specifically include the following steps: the first processor 21 determines indices of the ECCEs in the first subframe of the R subframes according to the quantity of ECCEs constituting the first physical downlink control channel in the first subframe, a quantity of candidate locations for sending the first physical downlink control channel in the first subframe, and a quantity of ECCEs included in the first subframe; and the first processor 21 determines indices of the ECCEs in each of the R−1 other subframes than the first subframe of the R subframes according to a second preset rule and the indices of the ECCEs in the first subframe.

Alternatively, the first processor 21 may further receive, by using the first transceiver 22, indices that are of the ECCEs constituting the first physical downlink control channel in the first subframe of the R subframes and that are sent by the base station; and the first processor 21 determines, according to a second preset rule and the indices of the ECCEs constituting the first physical downlink control channel in the first subframe, indices of the ECCEs constituting the first physical downlink control channel in each of the R−1 other subframes than the first subframe of the R subframes.

The second preset rule may be as follows: The indices of the ECCEs constituting the first physical downlink control channel in each of the R−1 other subframes in the R subframes are the same as the indices of the ECCEs constituting the first physical downlink control channel in the first subframe, or a functional relationship exists between the indices of the ECCEs constituting the first physical downlink control channel in each of the R−1 other subframes and the indices of the ECCEs constituting the first physical downlink control channel in the first subframe. Persons skilled in the art may perform setting according to actual experience.

For example, the UE may first determine indices of the ECCEs in the start subframe of the R subframes. Then, for indices of the ECCEs corresponding to the first physical downlink control channel in each subframe from the second subframe to the Rth subframe, refer to the indices of the ECCEs in the start subframe. For example, the indices of the ECCEs corresponding to the first physical downlink control channel in each subframe from the second subframe to the Rth subframe are the same as the indices of the ECCEs in the start subframe.

Further, when the first processor 21 obtains the first parameter used to determine the scrambling code sequence for scrambling the block of bits transmitted on the first physical downlink control channel, the following step may be specifically included: when the first physical downlink control channel is mapped to physical resource blocks PRBs included in two EPDCCH configuration sets, the first processor 21 determines the first parameter according to parameters that are in the two EPDCCH configuration sets and that are respectively used to determine a scrambling code sequence.

Further, when the first processor 21 obtains the second parameter used to determine the demodulation reference signal associated with the first physical downlink control channel, the following step may be specifically included: when the first physical downlink control channel is mapped to physical resource blocks PRBs included in two EPDCCH configuration sets, the first processor 21 determines the second parameter according to parameters that are in the two EPDCCH configuration sets and that are respectively used to determine a demodulation reference signal.

Further, when the first processor 21 obtains the antenna port number associated with the first physical downlink control channel in each of the R subframes, the following step may be specifically included: if the DCI carried on the first physical downlink control channel is used to schedule a cell-specific message, and a normal cyclic prefix is configured in an LTE system, the first processor 21 determines that the associated antenna port number is a number in {107, 108, 109, 110}; if the DCI carried on the first physical downlink control channel is used to schedule a cell-specific message, and an extended cyclic prefix is configured in an LTE system, the first processor 21 determines that the associated antenna port number is a number in {107, 108}; if the DCI carried on the first physical downlink control channel is used to schedule a UE-specific message, and a normal cyclic prefix is configured in an LTE system, when the R subframes include a normal subframe and a first-type special subframe, the first processor 21 determines that the associated antenna port number is a number in {107,109}; if the DCI carried on the first physical downlink control channel is used to schedule a UE-specific message, and a normal cyclic prefix is configured in an LTE system, when the R subframes do not include a first-type special subframe, the first processor 21 determines that the associated antenna port number is a number in {107, 108, 109, 110}; or if the DCI carried on the first physical downlink control channel is used to schedule a UE-specific message, and an extended cyclic prefix is configured in an LTE system, the first processor 21 determines that the associated antenna port number is a number in {107, 109}.

Particularly, if the DCI carried on the first physical downlink control channel is used to schedule the UE-specific message, and the R subframes include the normal subframe and the first-type special subframe, when the normal cyclic prefix is configured in the LTE system, the first processor 21 determines the associated antenna port number in {107, 109} according to a lowest ECCE index used in the first physical downlink control channel, the quantity of ECCEs constituting the first physical downlink control channel, and a quantity of ECCEs carried in a PRB pair in the first-type special subframe.

If the DCI carried on the first physical downlink control channel is used to schedule the UE-specific message, and the R subframes do not include the first-type special subframe, when the normal cyclic prefix is configured in the LTE system, the first processor 21 determines the associated antenna port number in {107, 108, 109, 110} according to a lowest ECCE index used in the first physical downlink control channel, the quantity of ECCEs occupied by the first physical downlink control channel, and a quantity of ECCEs carried in a PRB pair in the normal subframe.

Further, when obtaining the parameter set for transmitting the first physical downlink control channel, the first processor 21 may receive, by using the first transceiver 22, configuration information sent by the base station.

The configuration information includes the information indicating the R subframes occupied for sending the first physical downlink control channel. Alternatively, the configuration information includes the information indicating the R subframes occupied for sending the first physical downlink control channel, and at least one of the following parameters in at least one of the R subframes: a quantity of ECCEs constituting the first physical downlink control channel, indices of the ECCEs, a first parameter used to determine a scrambling code sequence for scrambling a block of bits transmitted on the first physical downlink control channel, a second parameter used to determine a demodulation reference signal associated with the first physical downlink control channel, an associated antenna port number, or a transmission type of the first physical downlink control channel.

Further, the format of the DCI includes a first DCI format and a second DCI format, DCI in the first DCI format includes scheduling information used for scheduling a physical downlink shared channel PDSCH, and DCI in the second DCI format includes a part or all of information about a random access response RAR.

Specifically, after the first transceiver 22 receives, at the first candidate location, the first physical downlink control channel sent by the base station, the following step may be further included: the first processor 21 determines the format of the DCI according to information about a first bit in the DCI carried on the first physical downlink control channel; or the first processor 21 determines the format of the DCI according to a scrambling code for scrambling CRC, where the CRC is CRC attached to the DCI carried on the first physical downlink control channel; or the first processor 21 determines the format of the DCI according to at least one of the quantity R of subframes occupied for sending the first physical downlink control channel, a quantity of ECCEs constituting the first physical downlink control channel, or indices of the ECCEs constituting the first physical downlink control channel.

Figure 11:
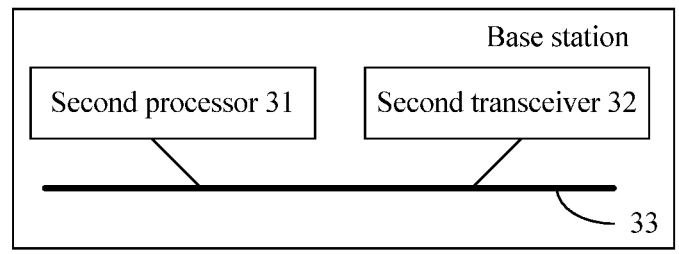
FIG. 11 is a schematic structural diagram of an entity of a base station according to an embodiment of the present invention.

FIG. 11 is a schematic structural diagram of another downlink control channel transmission apparatus according to an embodiment of the present invention. The downlink control channel transmission apparatus provided in this embodiment of the present invention may be configured to perform the methods implemented in the embodiments of the present invention shown in FIG. 1 to FIG. 7. For ease of description, only a part related to this embodiment of the present invention is shown. For specific technical details that are not disclosed, refer to the embodiments of the present invention shown in FIG. 1 to FIG. 7.

The downlink control channel transmission apparatus may be specifically a base station, such as a macro base station, a micro base station, a remote radio base station, or a repeater.

For example, the base station includes a second processor 31, a second transceiver 32, and a bus 33. The second processor 3i and the second transceiver 32 may be connected and perform communication by using the bus 33.

Specifically, in the base station provided in this embodiment of the present invention, the second processor 31 is configured to: obtain a parameter set for transmitting a first physical downlink control channel, where the first physical downlink control channel is used for sending same downlink control information DCI in at least R subframes, and R is an integer greater than or equal to i; determine, according to the parameter set, N candidate locations for sending the first physical downlink control channel to UE, where the candidate location includes the R subframes, and N is an integer greater than or equal to i; and determine a first candidate location in the N candidate locations as a location for sending the first physical downlink control channel to the UE. The second transceiver 32 is configured to send the first physical downlink control channel to the UE at the first candidate location.

The parameter set includes information indicating the R subframes occupied for transmitting the first physical downlink control channel, and the following parameters in each of the R subframes: a quantity of enhanced control channel elements ECCEs constituting the first physical downlink control channel, indices of the ECCEs, a first parameter used to determine a scrambling code sequence for scrambling a block of bits transmitted on the first physical downlink control channel, a second parameter used to determine a demodulation reference signal associated with the first physical downlink control channel, an antenna port number associated with the first physical downlink control channel, and a transmission type of the first physical downlink control channel.

Further, after the second processor 31 obtains the parameter set for transmitting the first physical downlink control channel, the second transceiver 32 may further send configuration information to the UE.

The configuration information includes the information indicating the R subframes occupied for sending the first physical downlink control channel. Alternatively, the configuration information includes the information indicating the R subframes occupied for sending the first physical downlink control channel, and at least one of the following parameters in at least one of the R subframes: a quantity of ECCEs constituting the first physical downlink control channel, indices of the ECCEs, a first parameter used to determine a scrambling code sequence for scrambling a block of bits transmitted on the first physical downlink control channel, a second parameter used to determine a demodulation reference signal associated with the first physical downlink control channel, an antenna port number associated with the first physical downlink control channel, or a transmission type of the first physical downlink control channel.

According to the downlink control channel transmission apparatus provided in this embodiment of the present invention, UE obtains a parameter set for transmitting a first physical downlink control channel, and determines, according to the parameter set, N candidate locations for transmitting the first physical downlink control channel by a base station. Each candidate location includes the R subframes, and same DCI is included in the R subframes. That is, according to the physical downlink control channel transmission method provided in this embodiment of the present invention, the first physical downlink control channel may be transmitted in the R subframes. Therefore, compared with the prior art in which in one subframe (1 ms), UE needs to monitor multiple candidate EPDCCHs and attempt to decode each candidate EPDCCH in a candidate EPDCCH set according to configuration information, the UE may receive the first physical downlink control channel in each of the R subframes, so that signal strength of receiving the first physical downlink control channel by the UE is enhanced.

It may be clearly understood by persons skilled in the art that, for the purpose of convenient and brief description, division of the foregoing function modules is merely used as an example for illustration. In actual application, the foregoing functions can be allocated to different function modules and implemented according to a requirement, that is, an inner structure of an apparatus is divided into different function modules to implement all or some of the functions described above. For a detailed working process of the described system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, the module or unit division is merely logical function division and may be other division in an actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual requirements to achieve the objectives of the solutions of the embodiments.

In addition, functional units in the embodiments of the present invention may be integrated into one processing unit, or each of the units may exist alone physically, or at least two units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of the present invention essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor (processor) to perform all or some of the steps of the methods described in the embodiments of the present invention. The foregoing storage medium includes: any medium that can store program code, such as a USB flash drive, a removable hard disk, a read-only memory (ROM), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A method, comprising:
obtaining, by a terminal, a parameter set corresponding to a first physical downlink control channel, wherein downlink control information (DCI) is transmitted in R subframes of the first physical downlink control channel, the same DCI is sent in each of the R subframes, and R is an integer greater than 1;
determining, by the terminal according to the parameter set, N candidate locations for transmitting the first physical downlink control channel by a base station, wherein each of the N candidate locations comprise the R subframes, and N is an integer greater than or equal to 1;
monitoring, by the terminal at the N candidate locations, whether the base station is currently sending the first physical downlink control channel; and
receiving, by the terminal at a first candidate location of the N candidate locations, the first physical downlink control channel sent by the base station.

2. The method according to claim 1, wherein the parameter set comprises information indicating the R subframes in which the DCI of the first physical downlink control channel is sent, and the following parameters for each of the R subframes:
a quantity of enhanced control channel elements (ECCEs) constituting the first physical downlink control channel in the respective subframe, indices of the ECCEs constituting the first physical downlink control channel in the respective subframe, a first parameter used to determine a scrambling code sequence for scrambling a block of bits transmitted on the first physical downlink control channel in the respective subframe, a second parameter used to determine a demodulation reference signal associated with the first physical downlink control channel in the respective subframe, an antenna port number associated with the first physical downlink control channel in the respective subframe, and a transmission type of the first physical downlink control channel in the respective subframe.

3. The method according to claim 2, wherein obtaining, by the terminal, the parameter set corresponding to the first physical downlink control channel, the parameter set comprising, for each of the R subframes, the quantity of ECCEs constituting the first physical downlink control channel in the respective subframe, comprises:

receiving, by the terminal from the base station, a quantity of ECCEs constituting the first physical downlink control channel in a first subframe of the R subframes, wherein the first subframe is any one of the R subframes; and determining, by the terminal according to a first preset rule and the quantity of ECCEs constituting the first physical downlink control channel in the first subframe, a quantity of ECCEs constituting the first physical downlink control channel in each of R−1 other subframes than the first subframe of the R subframes.

4. The method according to claim 2, wherein obtaining, by the terminal, the parameter set corresponding to the first physical downlink control channel, the parameter set comprising, for each of the R subframes, the first parameter used to determine the scrambling code sequence for scrambling the block of bits transmitted on the first physical downlink control channel the respective subframe, comprises:

when the first physical downlink control channel is mapped to physical resource blocks (PRBs) comprised in two enhanced physical downlink control channel (EPDCCH) configuration sets, determining, by the terminal, the first parameter according to a plurality of parameters that are comprised in the two EPDCCH configuration sets and that are respectively used to determine a scrambling code sequence.

5. The method according to claim 2, wherein the obtaining, by a terminal, the parameter set corresponding to the first physical downlink control channel, the parameter set comprising, for each of the R subframes, the second parameter used to determine the demodulation reference signal associated with the first physical downlink control channel in the respective subframe, comprises:

when the first physical downlink control channel is mapped to physical resource blocks (PRBs) comprised in two EPDCCH configuration sets, determining, by the terminal, the second parameter according to a plurality of parameters that are comprised in the two EPDCCH configuration sets and that are respectively used to determine a demodulation reference signal.

6. An apparatus, comprising:
a processor; and
a transceiver that is connected to the processor;
wherein the processor is configured to:
   obtain a parameter set corresponding to a first physical downlink control channel, wherein downlink control information (DCI) is transmitted in at least R subframes of the first physical downlink control channel, the same DCI is sent in each of the R subframes, and R is an integer greater than 1;
   determine, according to the parameter set, N candidate locations for transmitting the first physical downlink control channel by a base station, wherein each of the N candidate locations comprise the R subframes, and N is an integer greater than or equal to 1; and
   monitor, at the N candidate locations using the transceiver, whether the base station is currently sending the first physical downlink control channel; and
wherein the transceiver is further configured to receive, at a first candidate location of the N candidate locations, the first physical downlink control channel sent by the base station.

7. The apparatus according to claim 6, wherein the parameter set comprises information indicating the R subframes in which the DCI of the first physical downlink control channel is sent, and the following parameters for each of the R subframes:

a quantity of enhanced control channel elements (ECCEs) constituting the first physical downlink control channel in the respective subframe, indices of the ECCEs in the respective subframe, a first parameter used to determine a scrambling code sequence for scrambling a block of bits transmitted on the first physical downlink control channel in the respective subframe, a second parameter used to determine a demodulation reference signal associated with the first physical downlink control channel in the respective subframe, an antenna port number associated with the first physical downlink control channel in the respective subframe, and a transmission type of the first physical downlink control channel in the respective subframe.

8. The apparatus according to claim 7, wherein the processor being configured to obtain the parameter set corresponding to the first physical downlink control channel, the parameter set comprising, for each of the R subframes, the quantity of ECCEs constituting the first physical downlink control channel in the respective subframe, comprises:

the transceiver being configured to receive, from the base station, a quantity of ECCEs constituting the first physical downlink control channel in a first subframe of the R subframes, wherein the first subframe is any one of the R subframes; and the processor being configured to determine according to a first preset rule and the quantity of ECCEs constituting the first physical downlink control channel in the first subframe, a quantity of ECCEs constituting the first physical downlink control channel in each of R−1 other subframes than the first subframe of the R subframes.

9. The apparatus according to claim 7, wherein the processor being configured to obtain the parameter set corresponding to the first physical downlink control channel, the parameter set comprising, for each of the R subframes, the first parameter used to determine the scrambling code sequence for scrambling the block of bits transmitted on the first physical downlink control channel in the respective subframe, comprises the processor being configured to:

when the first physical downlink control channel is mapped to physical resource blocks (PRBs) comprised in two enhanced physical downlink control channel (EPDCCH) configuration sets, determine the first parameter according to a plurality of parameters that are in the two EPDCCH configuration sets and that are respectively used to determine a scrambling code sequence.

10. The apparatus according to claim 7, wherein the processor being configured to obtain the parameter set corresponding to the first physical downlink control channel, the parameter set comprising, for each of the R subframes, the second parameter used to determine the demodulation reference signal associated with the first physical downlink control channel in the respective subframe, comprises the processor being configured to:

when the first physical downlink control channel is mapped to physical resource blocks (PRBs) comprised in two EPDCCH configuration sets, determine the second parameter according to a plurality of parameters that are in the two EPDCCH configuration sets and that are respectively used to determine a demodulation reference signal.

11. A non-transitory computer-readable storage medium comprising instructions which, when executed by a computer, cause the computer to:

obtain a parameter set corresponding to a first physical downlink control channel, wherein downlink control information (DCI) is transmitted in at least R subframes of the first physical downlink control channel, the same DCI is sent in each of the R subframes, and R is an integer greater than 1;

determine, according to the parameter set, N candidate locations for transmitting the first physical downlink control channel by a base station, wherein each of the N candidate locations comprise the R subframes, and N is an integer greater than or equal to 1;

monitor, at the N candidate locations, whether the base station is currently sending the first physical downlink control channel; and receive, at a first candidate location of the N candidate locations, the first physical downlink control channel sent by the base station.

12. The non-transitory computer-readable storage medium according to claim 11, wherein the parameter set comprises information indicating the R subframes in which the DCI of the first physical downlink control channel is sent, and the following parameters for each of the R subframes:

a quantity of enhanced control channel elements (ECCEs) constituting the first physical downlink control channel in the respective subframe, indices of the ECCEs in the respective subframe, a first parameter used to determine a scrambling code sequence for scrambling a block of bits transmitted on the first physical downlink control channel in the respective subframe, a second parameter used to determine a demodulation reference signal associated with the first physical downlink control channel in the respective subframe, an antenna port number associated with the first physical downlink control channel in the respective subframe, and a transmission type of the first physical downlink control channel in the respective subframe.

13. The non-transitory computer-readable storage medium according to claim 12, wherein obtaining the parameter set corresponding to the first physical downlink control channel, the parameter set comprising, for each of the R subframes, the quantity of ECCEs constituting the first physical downlink control channel in each of the R subframes in the respective subframe, comprises:

receiving, from the base station, a quantity of ECCEs constituting the first physical downlink control channel in a first subframe of the R subframes, wherein the first subframe is any one of the R subframes; and determining, according to a first preset rule and the quantity of ECCEs constituting the first physical downlink control channel in the first subframe, a quantity of ECCEs constituting the first physical downlink control channel in each of R−1 other subframes than the first subframe of the R subframes.

14. The non-transitory computer-readable storage medium according to claim 12, wherein obtaining the parameter set corresponding to the first physical downlink control channel, the parameter set comprising, for each of the R subframes, the first parameter used to determine the scrambling code sequence for scrambling the block of bits transmitted on the first physical downlink control channel in the respective subframe, comprises:

when the first physical downlink control channel is mapped to physical resource blocks (PRBs) comprised in two physical downlink control channel (EPDCCH) configuration sets, determining the first parameter according to a plurality of parameters that are in the two EPDCCH configuration sets and that are respectively used to determine a scrambling code sequence.

15. The non-transitory computer-readable storage medium according to claim 12, wherein obtaining the parameter set corresponding to the first physical downlink control channel, the parameter set comprising, for each of the R subframes, the second parameter used to determine the demodulation reference signal associated with the first physical downlink control channel in the respective subframe, comprises:

when the first physical downlink control channel is mapped to physical resource blocks (PRBs) comprised in two EPDCCH configuration sets, determining the second parameter according to a plurality of parameters that are in the two EPDCCH configuration sets and that are respectively used to determine a demodulation reference signal.

16. An apparatus, comprising:
at least one processor;
an input-output interface; and
at least one non-transitory storage medium storing instructions for execution by the processor such that, when the instruction are executed, the at least one processor is configured to:

obtain a parameter set corresponding to a first physical downlink control channel, wherein downlink control information (DCI) is transmitted in at least R subframes of the first physical downlink control channel, the same DCI is sent in each of the R subframes, and R is an integer greater than 1;

determine, according to the parameter set, N candidate locations for transmitting the first physical downlink control channel by a base station, wherein each of the N candidate locations comprise the R subframes, and N is an integer greater than or equal to 1;

monitor, at the N candidate locations, whether the base station is currently sending the first physical downlink control channel; and receive, through the input-output interface at a first candidate location of the N candidate locations, the first physical downlink control channel sent by the base station.

17. The apparatus according to claim 16, wherein the parameter set comprises information indicating the R subframes in which the DCI of the first physical downlink control channel is sent, and the following parameters for each of the R subframes:

a quantity of enhanced control channel elements (ECCEs) constituting the first physical downlink control channel in the respective subframe, indices of the ECCEs in the respective subframe, a first parameter used to determine a scrambling code sequence for scrambling a block of bits transmitted on the first physical downlink control channel in the respective subframe, a second parameter used to determine a demodulation reference signal associated with the first physical downlink control channel in the respective subframe, an antenna port number associated with the first physical downlink control channel in the respective subframe, and a transmission type of the first physical downlink control channel in the respective subframe.

18. The apparatus according to claim 17, wherein the processor being configured to obtain the parameter set corresponding to the first physical downlink control channel, the parameter set comprising, for each of the R subframes, the quantity of ECCEs constituting the first physical downlink control channel in the respective subframe, comprises the processor being configured to:
- receive, from the base station through the input-output interface, a quantity that is of ECCEs constituting the first physical downlink control channel in a first subframe of the R subframes, wherein the first subframe is any one of the R subframes; and
- determine, according to a first preset rule and the quantity of ECCEs constituting the first physical downlink control channel in the first subframe, a quantity of ECCEs constituting the first physical downlink control channel in each of R−1 other subframes than the first subframe of the R subframes.

19. The apparatus according to claim 17, wherein the processor being configured to obtain the parameter set corresponding to the first physical downlink control channel, the parameter set comprising, for each of the R subframes, the first parameter used to determine the scrambling code sequence for scrambling the block of bits transmitted on the first physical downlink control channel in the respective subframe, comprises the processor being configured to:
- when the first physical downlink control channel is mapped to physical resource blocks (PRBs) comprised in two enhanced physical downlink control channel (EPDCCH) configuration sets, determining the first parameter according to a plurality of parameters that are in the two EPDCCH configuration sets and that are respectively used to determine a scrambling code sequence.

20. The apparatus according to claim 17, wherein the processor being configured to obtain the parameter set corresponding to the first physical downlink control channel, the parameter set comprising, for each of the R subframes, the second parameter used to determine the demodulation reference signal associated with the first physical downlink control channel in the respective subframe, comprises the processor being configured to:
- when the first physical downlink control channel is mapped to physical resource blocks (PRBs) comprised in two EPDCCH configuration sets, determining the second parameter according to a plurality of parameters that are in the two EPDCCH configuration sets and that are respectively used to determine a demodulation reference signal.

* * * * *